(12) United States Patent
Endoh et al.

(10) Patent No.: US 11,488,023 B2
(45) Date of Patent: Nov. 1, 2022

(54) ADAPTABILITY CALCULATION METHOD, ADAPTABILITY CALCULATION DEVICE, IDENTIFICATION METHOD, IDENTIFICATION DEVICE, AND COMPUTER-READABLE RECORDING MEDIUM

(71) Applicant: FUJITSU LIMITED, Kawasaki (JP)

(72) Inventors: Toshio Endoh, Yokohama (JP); Takashi Katoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 884 days.

(21) Appl. No.: 16/358,801

(22) Filed: Mar. 20, 2019

(65) Prior Publication Data

US 2019/0303766 A1 Oct. 3, 2019

(30) Foreign Application Priority Data

Mar. 28, 2018 (JP) .............................. JP2018-063222

(51) Int. Cl.
*G06N 3/08* (2006.01)
*G06N 3/04* (2006.01)

(52) U.S. Cl.
CPC ........... *G06N 3/088* (2013.01); *G06N 3/0445* (2013.01)

(58) Field of Classification Search
CPC ........ G06N 3/088; G06N 3/0445; G06N 3/08; G06N 3/04; G06N 3/0454
See application file for complete search history.

(56) References Cited

U.S. PATENT DOCUMENTS

| | | | |
|---|---|---|---|
| 2011/0179052 A1 | 7/2011 | Sato | |
| 2016/0155049 A1 | 6/2016 | Choi | |
| 2018/0053502 A1* | 2/2018 | Biadsy | .................... G10L 15/18 |
| 2018/0268806 A1* | 9/2018 | Chun | ..................... G10L 13/047 |
| 2020/0082165 A1* | 3/2020 | Wang | .................. G06K 9/6271 |
| 2020/0410344 A1* | 12/2020 | Kaiser | .................. G06N 3/0454 |

FOREIGN PATENT DOCUMENTS

| | | |
|---|---|---|
| JP | 2-129782 | 5/1990 |
| JP | 2010-122746 A | 6/2010 |
| JP | 2011-113360 A | 6/2011 |
| JP | 2011-145958 | 7/2011 |
| JP | 2016-6617 | 1/2016 |
| JP | 2016-103262 | 6/2016 |
| JP | 2017-54214 | 3/2017 |
| JP | 2018-45673 A | 3/2018 |
| WO | 2018/020277 A1 | 2/2018 |

OTHER PUBLICATIONS https://web.archive.org/web/20170720143217/https://en.wikipedia.org/wiki/Autoencoder 2017, pp. 5.*
Japanese Office Action dated Jan. 4, 2022 from Japanese Application No. 2018-063222.

* cited by examiner

*Primary Examiner* — Li Wu Chang
(74) *Attorney, Agent, or Firm* — Staas & Halsey LLP

(57) ABSTRACT

An adaptability calculation device inputs input data to a learning model and an encoder of an autoencoder that have performed learning with learning data, inputs an output from the learning model and an output from the encoder of the autoencoder to a decoder of the autoencoder, and calculates adaptability of the output from the learning model to the input data based on an output from the decoder and the input data.

15 Claims, 13 Drawing Sheets

RECONSTRUCTION ERROR
(GAP BETWEEN INPUT AND
OUTPUT)

| CHARACTER | AE110-1 (DECODER OUTPUT) | AE110-1 (RECONSTRUC- TION ERROR) | AE110-2 (DECODER OUTPUT) | AE110-2 (RECONSTRUC- TION ERROR) |
|---|---|---|---|---|
| 1 | 1 | SMALL | l | LARGE |
| l | 1 | LARGE | l | SMALL |

| CHARACTER | DL100-1 | AE110-1 (DECODER OUTPUT) | AE110-2 (RECONSTRUCTION ERROR) |
|---|---|---|---|
| 7 | 1 | 1 | LARGE |

| CHARACTER | DL100-2 | AE110-2 (DECODER OUTPUT) | AE110-2 (RECONSTRUCTION ERROR) |
|---|---|---|---|
| 7 | 7 | 7 | SMALL |

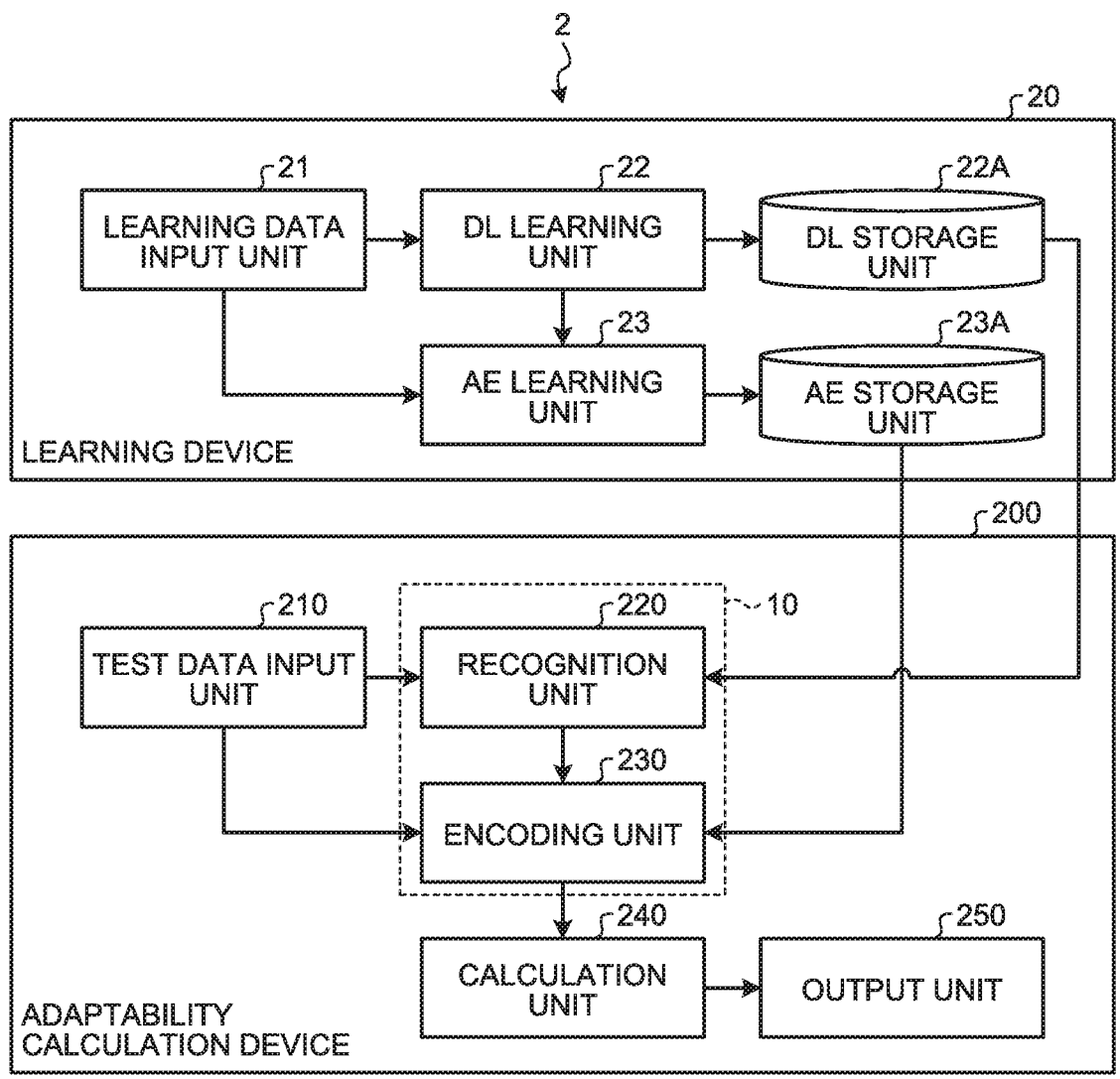

FIG.13

| TEST ID | DATA LABEL | DATA BODY | DATA VISUALIZATION |
|---|---|---|---|
| TT1 |  | I1' | 1 |
| TT2 |  | I2' | 7 |
| TT3 |  | I3' | I |

FIG.14

| TEST ID | DATA VISUALIZATION | RESULT OF DL100A |
|---|---|---|
| TT1 | 1 | 1 (CERTAINTY FACTOR: 0.8) |
| TT2 | 7 | 1 (CERTAINTY FACTOR: 0.9) |
| TT3 | I | 1 (CERTAINTY FACTOR: 0.9) |

FIG.15

| TEST ID | DATA VISUALIZATION | RESULT OF AE110A |
|---|---|---|
| TT1 | 1 | 1 (RECONSTRUCTION ERROR: 0.1) |
| TT2 | 7 | 1 (RECONSTRUCTION ERROR: 0.4) |
| TT3 | I | 1 (RECONSTRUCTION ERROR: 0.3) |

FIG.16

| TEST ID | DATA VISUALIZATION | ADAPTABILITY |
|---|---|---|
| TT1 | 1 | 1.00 |
| TT2 | 7 | 0.25 |
| TT3 | l | 0.33 |

FIG.17

| TEST ID | DATA VISUALIZATION | RESULT OF AE110A' |
|---|---|---|
| TT1 | 1 | 1 (RECONSTRUCTION ERROR: 0.1) |
| TT2 | 7 | 7 (RECONSTRUCTION ERROR: 0.1) |
| TT3 | l | 1 (RECONSTRUCTION ERROR: 0.3) |

FIG.18

| TEST ID | DATA VISUALIZATION | ADAPTABILITY | RECOGNITION RESULT |
|---|---|---|---|
| TT1 | 1 | 1.00 | 1 (CORRECTLY RECOGNIZED) |
| TT2 | 7 | 1.00 | 1 (ERRONEOUSLY RECOGNIZED) |
| TT3 | l | 0.33 | 1 (ERRONEOUSLY RECOGNIZED) |

| LEARNING ID | DATA LABEL | DATA BODY |
|---|---|---|
| TR1 | 1 AND 7 | I11, I12 |
| TR2 | I AND 7 | I21, I22 |

FIG.23

| TEST ID | DATA LABEL | DATA BODY | DATA VISUALIZATION |
|---|---|---|---|
| TT1 |  | I1' | 1 |
| TT2 |  | I2' | 7 |
| TT3 |  | I3' | l |

FIG.24

| TEST ID | DATA VISUALIZATION | RESULT OF DL300A | RESULT OF DL300B |
|---|---|---|---|
| TT1 | 1 | 1 (CERTAINTY FACTOR: 0.8) | l (CERTAINTY FACTOR: 0.9) |
| TT2 | 7 | 1 (CERTAINTY FACTOR: 0.9) | 7 (CERTAINTY FACTOR: 0.8) |
| TT3 | l | 1 (CERTAINTY FACTOR: 0.9) | l (CERTAINTY FACTOR: 0.8) |

FIG.25

| TEST ID | DATA VISUALIZATION | RESULT OF AE320A | RESULT OF AE320B |
|---|---|---|---|
| TT1 | 1 | 1 (RECONSTRUCTION ERROR: 0.1) | l (RECONSTRUCTION ERROR: 0.3) |
| TT2 | 7 | 1 (RECONSTRUCTION ERROR: 0.4) | 7 (RECONSTRUCTION ERROR: 0.1) |
| TT3 | l | 1 (RECONSTRUCTION ERROR: 0.3) | l (RECONSTRUCTION ERROR: 0.1) |

FIG.26

| TEST ID | DATA VISUALIZATION | SELECTION RESULT (ADAPTABILITY) | RECOGNITION RESULT |
|---|---|---|---|
| TT1 | 1 | AE320A (1.00) | 1 |
| TT2 | 7 | AE320B (1.00) | 7 |
| TT3 | l | AE320B (1.00) | l |

FIG.27

| TEST ID | DATA VISUALIZATION | RESULT OF AE320A' | RESULT OF AE320B' |
|---|---|---|---|
| TT1 | 1 | 1 (RECONSTRUCTION ERROR: 0.1) | l (RECONSTRUCTION ERROR: 0.3) |
| TT2 | 7 | 7 (RECONSTRUCTION ERROR: 0.1) | 7 (RECONSTRUCTION ERROR: 0.2) |
| TT3 | l | 1 (RECONSTRUCTION ERROR: 0.3) | l (RECONSTRUCTION ERROR: 0.1) |

FIG.28

| TEST ID | DATA VISUALIZATION | SELECTION RESULT (ADAPTABILITY) | RECOGNITION RESULT |
|---|---|---|---|
| TT1 | 1 | AE320A' (1.00) | 1 |
| TT2 | 7 | AE320A' (1.00) | 1 |
| TT3 | l | AE320B' (1.00) | l |

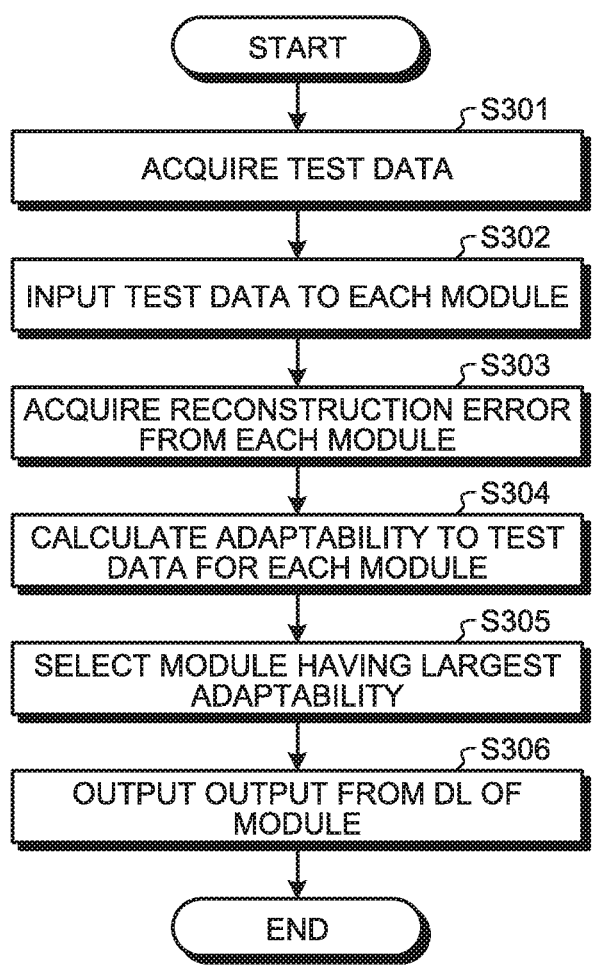

ADAPTABILITY CALCULATION METHOD, ADAPTABILITY CALCULATION DEVICE, IDENTIFICATION METHOD, IDENTIFICATION DEVICE, AND COMPUTER-READABLE RECORDING MEDIUM

CROSS-REFERENCE TO RELATED APPLICATIONS

This application is based upon and claims the benefit of priority of the prior Japanese Patent Application No. 2018-063222, filed on Mar. 28, 2018, the entire contents of which are incorporated herein by reference.

FIELD

The embodiments discussed herein are related to a computer-readable recording medium, an adaptability calculation method, an adaptability calculation device, a computer-readable recording medium, an identification method, and an identification device.

BACKGROUND

As an example of machine learning, deep learning (hereinafter, referred to as DL in some cases) has been known that uses a neural network having a multilayer structure as a learning model.

For example, at the time of learning, data to which a label in a class of correctness is given is input to a neuron of an input layer of a neural network (hereinafter, referred to as an NN in some cases) as learning data. As a result, weight of a synapse of the NN is learned based on an error between an output from each neuron of an output layer of the NN and the label of correctness given to the learning data. In this way, by inputting test data to a learning model of the NN that has learned the weight of the synapse, the test data is classified.

For example, related art has been developed in which learning of the NN is completed in a short time by performing learning with a plurality of NNs in a sharing manner. In this related art, the entire learning data registered in a whole learning database is divided by a learning database divider, and each of divided pieces of learning data is assigned to a learning database of each NN. At the time of learning, a combination of similarities with respect to character pattern candidates is input to the neuron of the input layer of each NN, the combination of similarities obtained by performing pattern matching between an input character pattern and each character pattern candidate. That is, by extracting a pair of the combination of similarities with respect to each character pattern candidate and data of correctness corresponding thereto one by one from each learning database, a load value is repeatedly corrected so that the data of correctness can be obtained for each NN. In a case of determining a character after such learning, an output from an NN having the largest certainty factor is used from among the NNs. Conventional technologies are described in Japanese Laid-open Patent Publication No. 2-129782, for example.

In view of using a plurality of learning models generated from pieces of learning data of different data sets, importance of sequential learning has been increasing. Sequential learning implements classification of a wide range of test data by combining a plurality of learning models to classify the test data.

However, in the related art, there is no method of determining whether the test data input to the learning model is adapted to the learning model. Thus, a wrong learning model may be selected for the test data at the time of sequential learning, and the test data may be unsuccessfully classified.

SUMMARY

According to an aspect of an embodiment, an adaptability calculation method executed by a computer, the adaptability calculation method includes: inputting input data to a learning model and an encoder of an autoencoder that have performed learning with learning data; inputting an output from the learning model and an output from the encoder of the autoencoder to a decoder of the autoencoder; and calculating adaptability of the output from the learning model to the input data based on an output from the decoder and the input data.

The object and advantages of the invention will be realized and attained by means of the elements and combinations particularly pointed out in the claims.

It is to be understood that both the foregoing general description and the following detailed description are exemplary and explanatory and are not restrictive of the inventioned.

BRIEF DESCRIPTION OF DRAWINGS

FIG. 11 is a diagram illustrating an example of functional configurations of respective devices included in an adaptability calculation system according to a second embodiment;

FIG. 12 is a diagram illustrating an example of learning data;

FIG. 13 is a diagram illustrating an example of test data;

FIG. 14 is a diagram illustrating an example of recognition results of the DL;

FIG. 15 is a diagram illustrating an example of output results of an AE;

FIG. 16 is a diagram illustrating an example of calculation results of adaptability;

FIG. 17 is a diagram illustrating an example of output results of the AE;

FIG. 18 is a diagram illustrating an example of calculation results of adaptability;

FIG. 23 is a diagram illustrating an example of test data;

FIG. 24 is a diagram illustrating an example of recognition results of the DL;

FIG. 25 is a diagram illustrating an example of output results of the AE;

FIG. 26 is a diagram illustrating an example of selection results of the module;

FIG. 27 is a diagram illustrating an example of output results of the AE;

FIG. 28 is a diagram illustrating an example of selection results of the module; and FIG. 29 is a flowchart illustrating a procedure of identification processing according to the third embodiment.

DESCRIPTION OF EMBODIMENTS

Figure 1:
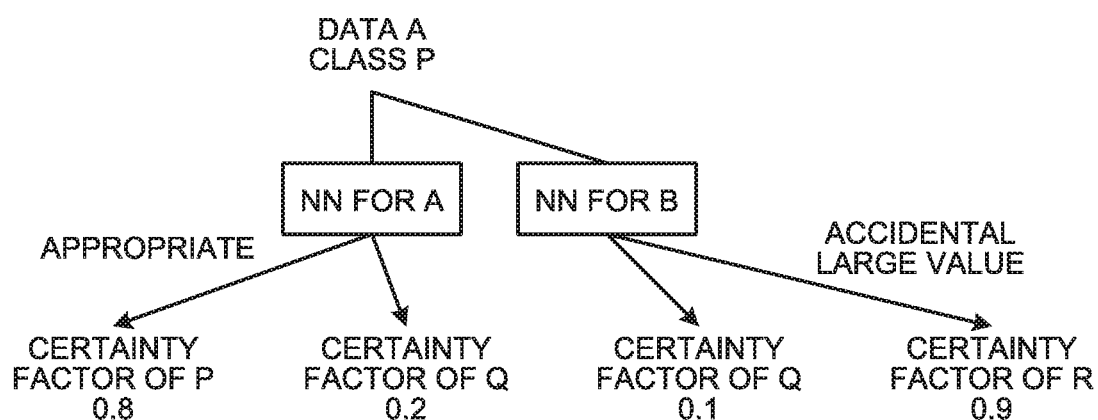
FIG. 1 is a diagram illustrating an example of inputs and outputs to/from an NN.

Preferred embodiments will be explained with reference to accompanying drawings. Embodiments described herein do not intend to limit the technique disclosed herein. The embodiments can be appropriately combined with each other without contradiction between pieces of processing content.

First Embodiment

Sequential Learning

First, before describing an identification device according to a first embodiment, the following describes importance of sequential learning. As described above in BACKGROUND, in view of using a plurality of learning models generated from pieces of learning data of different data sets, importance of sequential learning has been increasing. Sequential learning implements classification of a wide range of test data by combining a plurality of learning models to classify the test data.

The development of machine learning business is one cause of the increasing importance of sequential learning. For example, in the machine learning business, learning data is provided from a customer to a service provider of the machine learning business. By learning a model that performs classification using this learning data, a learning model is generated. The learning model implements various types of recognition such as image recognition and voice recognition. The generated learning model itself, or an output result of the learning model with respect to test data input by the customer is provided to the customer as a service.

In a case in which the customer owning learning data is different from the service provider of the machine learning business as described above, the learning data may be returned to the customer after the learning model is generated in view of a legal request such as copyright or compliance such as confidentiality. On the other hand, the learning model generated from the learning data is an asset of the service provider of the machine learning business, so that the learning model can be used continuously.

Aspect of Problem

In view of such a background, under an environment in which the learning model is returned after being generated, importance of the sequential learning that uses a plurality of learning models generated from pieces of learning data of different data sets is increasing, but the sequential learning is hardly implemented.

For example, a property of DL may become a hurdle for implementing the sequential learning. That is, the DL has an aspect that, when learning is performed on new learning data, the learning model is excessively adapted to the learning data. In this way, the learning model is excessively adapted to the learning data on which learning is lastly performed, so that the learning data on which learning has been performed therebefore is forgotten. For example, in a case in which a learning model that has performed learning with learning data A learns learning data B, the learning model after learning is adapted to the learning data B but forgets the learning data A. Thus, it is difficult to generate a learning model adapted to both of the learning data A and the learning data B.

As an idea for coping with the property of the DL, it can be considered to hold pieces of learning data of a plurality of data sets, and generate a learning model by causing all pieces of learning data to be repeatedly learned. In the above example, both of the learning data A and the learning data B are held, and the learning data A and the learning data B are alternately and repeatedly learned until the number of times of learning of the learning data A and the learning data B reaches a predetermined number of epochs. In this way, the learning model is adapted to both of the learning data A and the learning data B.

However, to achieve the above idea, all pieces of learning data need to be prepared. Thus, under a situation in which the learning model is returned after being generated, the returned learning data is unable to be prepared, so that all the pieces of learning data are hardly prepared. Even when all the pieces of learning data are prepared, it is preferable to refrain from using the learning data for the purpose of sequential learning in view of a legal request such as copyright or compliance such as confidentiality.

However, even if the related art described in BACKGROUND is used, the sequential learning described above is hardly implemented because of the following two reasons.

That is, in a case of selecting an output from an NN having the largest certainty factor from among a plurality of NNs as in the related art, recognition may be failed because (1) the output from the NN is inconstant for test data of unlearned category, or (2) a wrong NN is selected because an NN that can perform correct recognition is unknown even when a category is matched with that of test data.

FIG. 1 is a diagram illustrating an example of inputs and outputs to/from the NN. FIG. 1 illustrates, as an example of a plurality of NNs generated by using the related art described above, an NN for A that has performed learning with the learning data A, and an NN for B that has performed learning with the learning data B. Among these, at the time of learning of the NN for A, the learning data A to which a label of class P or class Q is given is input to a neuron of an input layer, and thus weight of a synapse is learned. On the other hand, at the time of learning of the NN for B, the learning data B to which a label of class Q or class R is given is input to a neuron of the input layer, and thus the weight of the synapse is learned.

In a case in which the test data belonging to the class P is input to the NN for A and the NN for B that has performed such learning, as illustrated in FIG. 1, the NN for A and the NN for B output a certainty factor for each label. In this case, the illustrated test data is data the class of which is matched with a class of a learning sample included in the data set of the learning data A used for learning of the NN for A. Thus, at the time of model learning of the NN for A, learning is performed such that a certainty factor higher than a certainty factor of the class Q is output as a certainty factor of the class P. Because of this, the certainty factor "0.8" that is larger than the certainty factor "0.2" of a label Q is output as the certainty factor of a label P together with the certainty factor "0.2" of the label Q from a neuron of an output layer of the NN for A. On the other hand, the model of the NN for B is learned in a state in which the learning sample to which the label of the class P is given is not included in the data set of the learning data B. In this way, in a case in which the test data that has not been learned by the NN for B is input, the certainty factor of the label output from the NN for B is inconstant. Thus, as illustrated in FIG. 1, while "0.1" is output as the certainty factor of the label Q from the neuron of the output layer of the NN for B, a large value such as "0.9" may be accidentally output as the certainty factor of the label R. In such a situation, the certainty factor "0.9" of the label R is the largest, and the output from the NN for B is used for recognition, so that the test data belonging to the class P is erroneously recognized as the class R.

Figure 2:
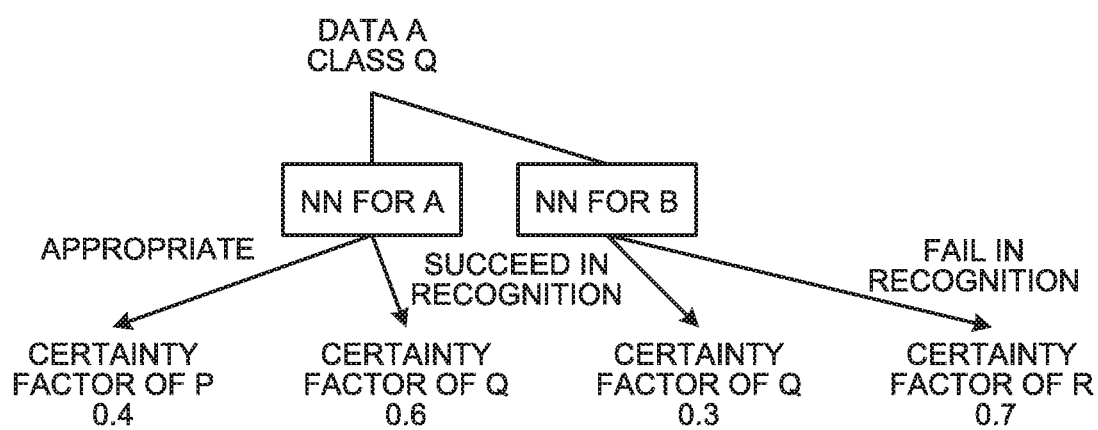
FIG. 2 is a diagram illustrating an example of inputs and outputs to/from the NN.

FIG. 2 is a diagram illustrating an example of inputs and outputs to/from the NN. Similarly to FIG. 1, FIG. 2 illustrates, as an example of a plurality of NNs generated by using the related art described above, the NN for A that has performed learning with the learning data A, and the NN for B that has performed learning with the learning data B. Additionally, in this example, the test data belonging to the class Q different from that in FIG. 1 is input.

In a case in which the test data belonging to the class Q is input to the NN for A and the NN for B, as illustrated in FIG. 2, the NN for A and the NN for B output the certainty factor for each label. That is, the certainty factor "0.4" of the label P and the certainty factor "0.6" of the label Q are output from the neuron of the output layer of the NN for A, and the certainty factor "0.3" of the label Q and the certainty factor "0.7" of the label R are output from the neuron of the output layer of the NN for B.

In this case, the data set of the learning data A and the data set of the learning data B both include the learning sample to which the label of the class Q is given. In this way, in a case in which there are a plurality of NNs matched with the category of the test data, it is unclear that which of the NN for A and the NN for B can correctly classify the class of the test data. Based on a result, it can be analyzed afterward that the NN for A succeeds in recognition because the class of the test data belongs to "Q", but this is merely an afterthought. Thus, in the related art, the certainty factor "0.7" of the class R output from the NN for B is the largest, so that the test data belonging to the class Q is erroneously recognized as the class R as a result that the output from the NN for B is used for recognition.

In this way, in the related art, the output from the wrong NN is selected because the output from the NN is inconstant for the test data of an unlearned category as described above with reference to FIG. 1, or the output from the wrong NN is selected because the NN that can perform correct recognition is unknown even when the category is matched with that of the test data as described above with reference to FIG. 2, so that classification of the test data may fail.

Aspect of Approach for Solving Problem

Thus, in the present embodiment, what is called an autoencoder is used for sequential learning. That is, in the present embodiment, the test data is input to the autoencoder that has performed learning with the learning data, adaptability of the learning model to the test data is calculated based on a reconstruction error between the test data and decoded data output from a decoder of the autoencoder, and an output result of the learning model is selected and output based on the adaptability.

Figure 3:
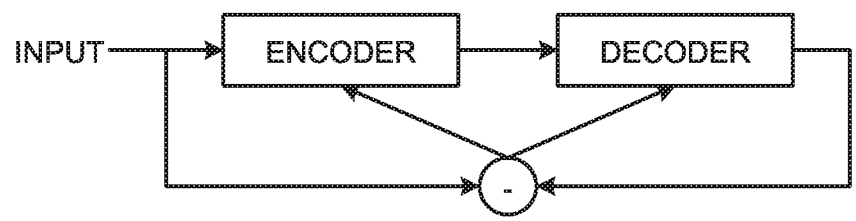
FIG. 3 is a diagram illustrating an example of an autoencoder.
Figure 4:
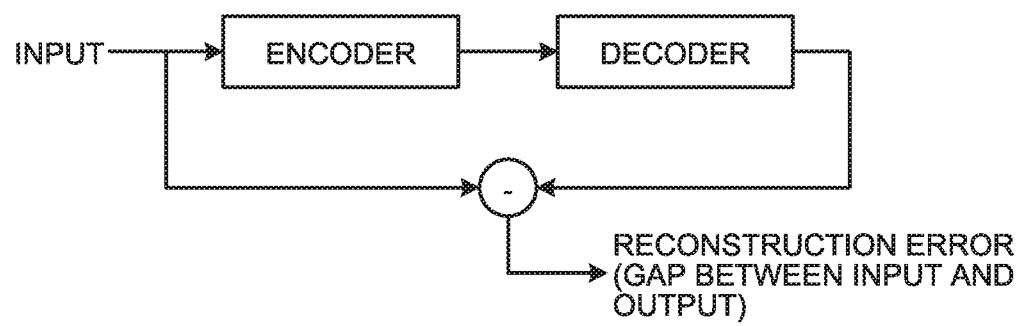
FIG. 4 is a diagram illustrating an example of the autoencoder.

FIG. 3 and FIG. 4 are diagrams illustrating an example of the autoencoder. FIG. 3 illustrates an operation of the autoencoder at the time of learning, and FIG. 4 illustrates an operation of the autoencoder at the time of recognition. The autoencoder illustrated in FIG. 3 and FIG. 4 outputs decoded data obtained such that a dimension of input learning data is compressed by an encoder and the dimension of the encoded data is reconstructed to be the original dimension by the decoder. As illustrated in FIG. 3, at the time of learning, weight of the NN is learned so that the output from the decoder of the autoencoder is matched with the input to the encoder of the autoencoder. On the other hand, as illustrated in FIG. 4, at the time of recognition, a gap between the input to the encoder of the autoencoder and the output from the decoder of the autoencoder is output as a reconstruction error. In the autoencoder that has performed such learning, as the data input to the autoencoder is more similar to the learning data, the reconstruction error output from the autoencoder is reduced.

By using the characteristic of the autoencoder, in the present embodiment, an autoencoding method for favorably compressing and reconstructing the learning data is learned instead of holding the learning data itself. Additionally, in the present embodiment, the output result of the learning model is input to the decoder of the autoencoder as a trigger for decoding. Due to this, learning of the autoencoder is implemented so that the test data is hardly reconstructed at the time of erroneous recognition when the learning model fails in classification.

After the autoencoder has performed learning, in the present embodiment, the test data is input to the learning model that has performed learning with the learning data and the encoder of the autoencoder, and adaptability of the output from the learning model to the test data is calculated based on the test data and the output from the decoder of the autoencoder to which the output from the encoder of the autoencoder and the output from the learning model are input.

As merely an aspect, the adaptability calculated as described above can be used for selecting an output result of the learning model to be output from among output results of a plurality of learning models.

Figure 5:
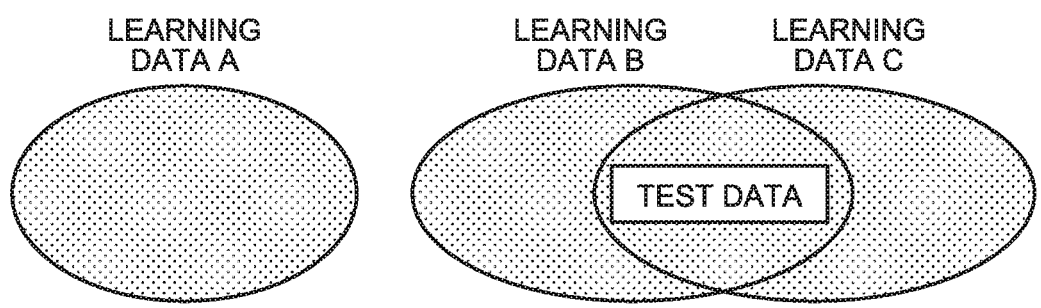
FIG. 5 is a diagram illustrating an example of relevance between learning data and test data.

FIG. 5 is a diagram illustrating an example of relevance between the learning data and the test data. FIG. 5 illustrates a set of categories of three pieces of learning data including the learning data A to learning data C. As illustrated in FIG. 5, the category of the learning data A is not overlapped with any of the category of the learning data B and the category of the learning data C, so that it can be found that the category of the learning data A has no relevance to the category of the learning data B and the category of the learning data C. On the other hand, the category of the learning data B and the category of the learning data C are partially overlapped with each other, so that it can be found that the learning data B has relevance to the learning data C.

In a case of the learning data A to the learning data C having such relevance, in the present embodiment, the output result of the NN for A that has been learned using the learning data A having no relevance to the test data can be excluded. This is because, in a case of multidimensional data such as an image, there is a low possibility, which is negligible, that the autoencoder generated from the learning data A having no relevance to the test data receives an input of the test data and accidentally reconstructs the test data itself to be output, so that the reconstruction error output from the autoencoder generated from the learning data A is increased.

Additionally, in the present embodiment, an output result of the NN for correctly classifying the class of the test data can be selected from among output results of the NN for B in a case in which the test data is input to the NN for B generated from the learning data B, and output results of an NN for C in a case in which the test data is input to the NN for C generated from the learning data C. That is, the category of the test data is matched with that of the learning data B and the learning data C. Thus, as in the present embodiment, when the output result of the learning model is not input to the decoder of the autoencoder as a trigger for decoding, reconstruction errors output from the autoencoder that has performed learning with the learning data B and the autoencoder that has performed learning with the learning data C are both reduced. Thus, it is difficult to select the output result of the NN for correctly classifying the class of the test data from among the output results of the NN for B and the output results of the NN for C. On the other hand, in the present embodiment, the output result of the learning model is input to the decoder of the autoencoder as a trigger for decoding. Due to this, at the time of erroneous recognition when the NN for B or the NN for C fails in classification, the decoder of the autoencoder performs reconstruction for decoding data similar to the learning data B or the learning data C corresponding to a wrong label input from the NN for B or the NN for C, so that the test data is hardly reconstructed. As compared with the time of erroneous recognition, at the time of successful recognition, the decoder of the autoencoder performs reconstruction for decoding data similar to the learning data B or the learning data C corresponding to a correct label, so that the test data is easily reconstructed. In this way, it is possible to relatively reduce the reconstruction error output from the autoencoder generated from the learning data B or the learning data C used for learning of the NN that can correctly classify the class of the test data.

Accordingly, in the present embodiment, an output from a wrong learning model is prevented from being selected, so that a possibility of failing in recognition can be reduced. Thus, according to the present embodiment, sequential learning using a plurality of learning models generated from pieces of learning data of different data sets can be implemented.

Configuration of Identification Device

Figure 6:
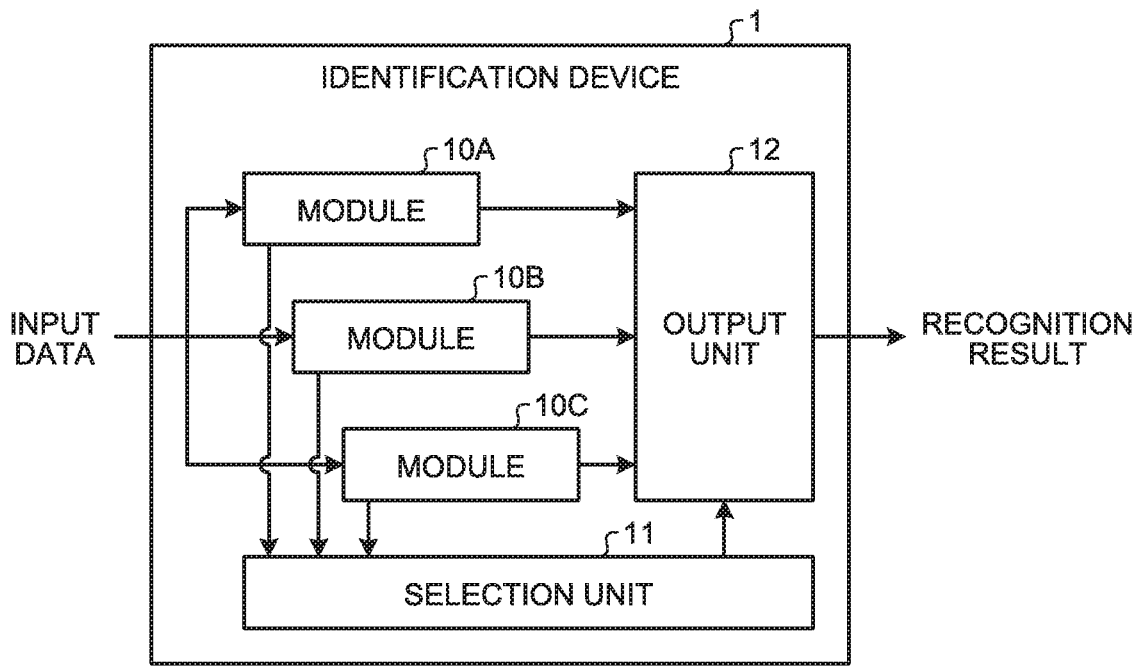
FIG. 6 is a block diagram illustrating an example of a functional configuration of an identification device according to a first embodiment.

FIG. 6 is a block diagram illustrating an example of a functional configuration of the identification device according to the first embodiment. As illustrated in FIG. 6, an identification device 1 includes modules 10A to 10C, a selection unit 11, and an output unit 12. Hereinafter, the modules 10A to 10C may be referred to as a "module 10".

Functional units such as the module 10, the selection unit 12, and an output unit 13 illustrated in FIG. 6 are virtually implemented by a hardware processor such as a central processing unit (CPU) and a micro processing unit (MPU). That is, the processor reads out an operating system (OS), and a program such as an identification program or an adaptability calculation program as a module thereof from a storage device (not illustrated) such as a hard disk drive (HDD), an optical disc, or a solid state drive (SSD). Thereafter, the processor executes the identification program or the adaptability calculation program to deploy a process corresponding to the functional unit on a memory such as a random access memory (RAM). As a result, the functional unit described above is virtually implemented as the process. The CPU and the MPU are exemplified as the processor herein, but the functional unit described above may be implemented by any processor such as a general-purpose processor and a specialized processor. Additionally, the functional unit described above may be implemented by hard wired logic such as an application specific integrated circuit (ASIC) or a field programmable gate array (FPGA).

The modules 10A to 10C each include the learning model of the DL and the autoencoder. As an aspect, at the time of learning, pieces of learning data of different data sets, for the modules 10A to 10C, are assigned to the learning model of the DL and the autoencoder of the respective modules 10A to 10C, and the pieces of learning data is individually learned. As another aspect, at the time of recognition, the test data is input to the modules 10A to 10C as input data. As a result, the reconstruction error output from the autoencoder of each of the modules 10A to 10C is output to the selection unit 11, and the output result of the learning model of the DL of each of the modules 10A to 10C is output to the output unit 12. FIG. 6 illustrates an example in which the identification device 1 includes the three modules 10A to 10C, but this is merely an example. The identification device 1 may include two, or four or more modules 10.

The selection unit 11 selects the output result of the module 10 to be output by the output unit 12 as a recognition result. As merely an example, the selection unit 11 selects, from among the output results of the DL output from each of the modules 10A to 10C, the output result of the DL of the module 10 in which the reconstruction error of the autoencoder output from each of the modules 10A to 10C is the smallest.

The output unit 12 outputs the recognition result. As an aspect, the output unit 12 outputs, to a predetermined output destination, the output result output from the DL of the module 10 selected by the selection unit 11 as the recognition result from among the output results of the DL output from each of the modules 10A to 10C. For example, in a case in which the test data is input as a request of authentication from an external client terminal, the client terminal can be caused to be the output destination. Additionally, a service or an application executed in a back end, artificial intelligence (AI), an external device of the identification device 1, and the like may be caused to be the output destination.

FIG. 6 exemplifies the three modules 10A to 10C, but the number of modules may be optional, for example, may be equal to the number of pieces of learning data assigned to the modules. The identification device 1 may also include various functional units included in a known computer, for example, a communication interface for performing communication control between the identification device 1 and another device in addition to the functional units illustrated in FIG. 6.

Figure 7:
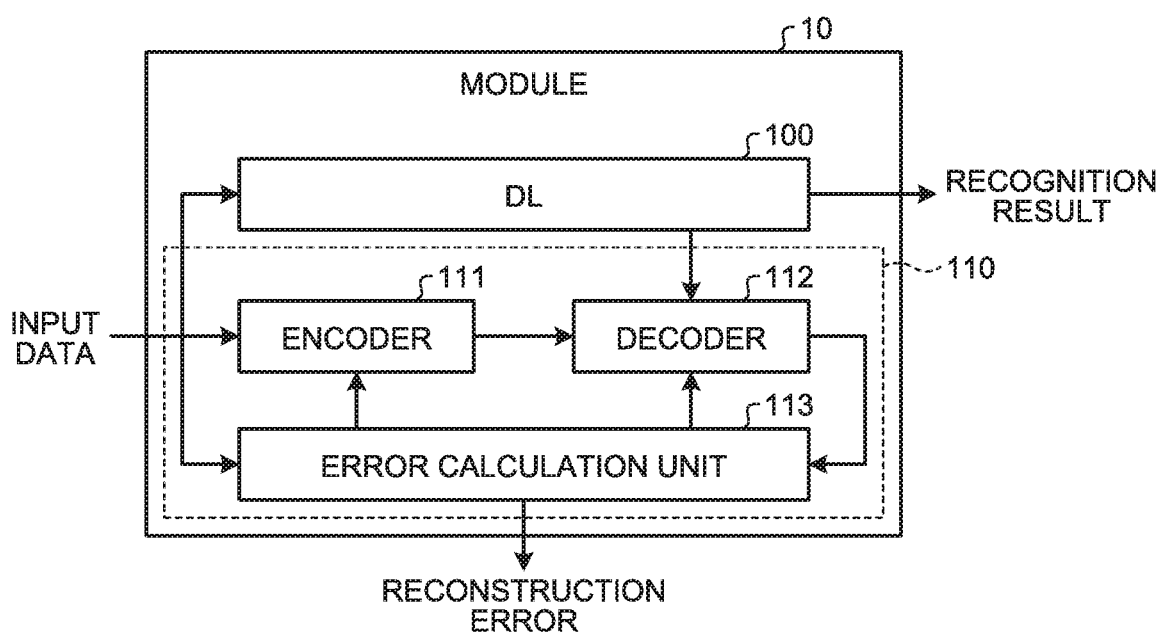
FIG. 7 is a block diagram illustrating a functional configuration of a module according to the first embodiment.

FIG. 7 is a block diagram illustrating a functional configuration of the module according to the first embodiment. As illustrated in FIG. 7, the module 10 includes a DL 100 and an autoencoder 110.

The DL 100 corresponds to an example of the learning model obtained by learning a model with the learning data. As an aspect, at the time of learning, the DL 100 is generated by inputting the learning data assigned to the module 10 to the neuron of the input layer, and learning the weight of the synapse based on an error between the output from the output layer and the label of correctness of the learning data. As another aspect, at the time of recognition, the DL 100 inputs the test data to the neuron of the input layer as the input data to output a certainty factor for each label from the neuron of the output layer.

The autoencoder 110 includes an encoder 111, a decoder 112, and an error calculation unit 113. As an aspect, at the time of learning, the weight of the NN of the autoencoder 110 is learned so that the output from the decoder 112 of the autoencoder 110 is matched with the learning data assigned to the module 10. At this point, the output result of the DL 100 is input to the decoder 112 as a trigger for decoding in addition to the output from the encoder 111. For example, the decoder 112 is caused to perform operation of decoding encoded data that is encoded by the encoder 111 so that the encoded data is brought closer to the learning data corresponding to the label having the largest certainty factor among certainty factors output by the DL 100 for each label. Due to this, learning of the autoencoder 110 can be implemented so that, at the time when the DL 100 fails in classification and erroneous recognition is caused, the learning data is hardly reconstructed. As another aspect, at the time of recognition, the error calculation unit 113 calculates a gap between the input to the autoencoder 110, that is, the test data, and the output from the decoder 112 as the reconstruction error. Also at the time of recognition, the output result of the DL 100 is input to the decoder 112 as a trigger for decoding in addition to the output from the encoder 111. Due to this, at the time when the DL 100 fails in classification and erroneous recognition is caused, the test data is hardly reconstructed.

FIRST SPECIFIC EXAMPLE

Figures 8, 9, 10:
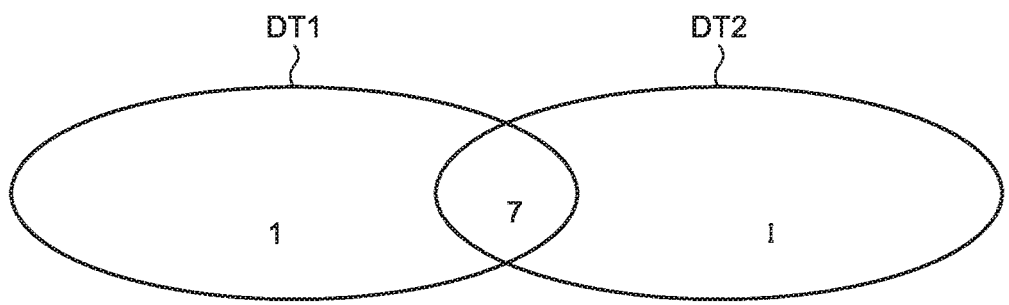
FIG. 8 is a diagram illustrating an example of data sets.
FIG. 9 is a diagram illustrating an example of outputs from the autoencoder.
FIG. 10 is a diagram illustrating an example of outputs from the autoencoder and a DL.

The following describes a specific example of sequential learning with reference to FIG. 8 to FIG. 10. FIG. 8 is a diagram illustrating an example of the data set. FIG. 8 illustrates data sets DT1 and DT2 of a character image as an example of the learning data. As illustrated in FIG. 8, any of labels "1" and "7" is given to the learning sample of the learning data of the data set DT1, while any of labels "7" and "I" is given to the learning sample of the learning data of the data set DT2. Among these, a DL 100-1 and an autoencoder 110-1 perform learning with the learning data of the data set DT1, and a DL 100-2 and an autoencoder 110-2 perform learning with the learning data of the data set DT2.

In a case in which the test data of the character image "1" and the character image "I" is input to the autoencoder 110-1 and the autoencoder 110-2 after such learning is performed, outputs from the autoencoder 110-1 and the autoencoder 110-2 is as illustrated in FIG. 9.

FIG. 9 is a diagram illustrating an example of outputs from the autoencoder. The upper row of FIG. 9 illustrates the outputs in a case in which the test data of the character image "1" is input, for each of the decoder of the autoencoder 110-1, the reconstruction error of the autoencoder 110-1, the decoder of the autoencoder 110-2, and the reconstruction error of the autoencoder 110-2. The lower row of FIG. 9 illustrates the outputs in a case in which the test data of the character image "I" is input, for each of the decoder of the autoencoder 110-1, the reconstruction error of the autoencoder 110-1, the decoder of the autoencoder 110-2, and the reconstruction error of the autoencoder 110-2.

As illustrated in the upper row of FIG. 9, in a case in which the test data of the character image "1" is input, the model is generated from the learning sample to which the label "1" is given at the time of learning in the DL 100-1 that has performed learning with the data set DT1, so that the label of correctness corresponding to the character image "1" can be output as the recognition result. In cooperation with this, the decoder of the autoencoder 110-1 decodes the encoded data encoded by the encoder to be the decoded data so that the decoded data is brought closer to the learning data corresponding to the label "1" output from the DL 100-1. Due to this, the reconstruction error output from the autoencoder 110-1 is reduced.

On the other hand, the data set DT2 does not include the learning sample to which the label "1" is given, so that the DL 100-2 that has performed learning with the data set DT2 is unable to correctly output the label corresponding to the character image "1". That is, the DL 100-2 outputs the label "I" similar to the test data of the character image "1" from the label "7" and the label "I" included in the data set DT2. In cooperation with this, the decoder of the autoencoder 110-2 decodes the encoded data encoded by the encoder to be the decoded data so that the decoded data is brought closer to the learning data corresponding to the label "I" output from the DL 100-2, so that reconstruction is performed to be distant from the label of correctness "1". Due to this, the reconstruction error output from the autoencoder 110-2 is increased.

Thus, in a case in which the test data of the character image "1" is input, by selecting the output from the DL 100-1 the reconstruction error of which is relatively small in the DL 100-1 and the DL-102, the output result of the DL 100-1 that correctly classifies the label corresponding to the character image "1" can be selected.

As illustrated in the lower row of FIG. 9, in a case in which the test data of the character image "I" is input, the data set DT1 does not include the learning sample to which the label "I" is given, so that the DL 100-1 that has performed learning with the data set DT1 is unable to output the label of correctness corresponding to the character image "I". That is, the DL 100-1 outputs the label "1" similar to the test data of the character image "I" from the label "1" and the label "7" included in the data set DT1. In cooperation with this, the decoder of the autoencoder 110-1 decodes the encoded data encoded by the encoder to be the decoded data so that the decoded data is brought closer to the learning data corresponding to the label "1" output from the DL 100-1, so that reconstruction is performed to be distant from the label of correctness "I". Due to this, the reconstruction error output from the autoencoder 110-1 is increased.

On the other hand, in a case in which the test data of the character image "I" is input, in the DL 100-2 that has performed learning with the data set DT2, the model of the DL 100-2 is generated from the learning sample to which the label "I" is given at the time of learning, so that the label of correctness corresponding to the character image "I" can be output as the recognition result. In cooperation with this, the decoder of the autoencoder 110-2 decodes the encoded data encoded by the encoder to be the decoded data so that the decoded data is brought closer to the learning data corresponding to the label "I" output from the DL 100-2. Due to this, the reconstruction error output from the autoencoder 110-2 is reduced.

Thus, in a case in which the test data of the character image "I" is input, by selecting the output from the DL 100-2 the reconstruction error of which is relatively small from the DL 100-1 and the DL-102, the output result of the DL 100-2 that classifies the label of correctness corresponding to the character image "I" can be selected.

In a case in which the test data of the character image "7" is input, the outputs illustrated in FIG. 10 are obtained for each of the DL 100-1, the decoder of the autoencoder 110-1, the reconstruction error of the autoencoder 110-1, the DL 100-2, the decoder of the autoencoder 110-2, and the reconstruction error of the autoencoder 110-2.

FIG. 10 is a diagram illustrating an example of outputs from the autoencoder and the DL. As illustrated in FIG. 10, in a case in which the test data of the character image "7" is input, the DL 100-1 that has performed learning with the data set DT1 does not output the label of correctness corresponding to the character image "7" as the recognition result, and outputs the wrong label "1". In cooperation with this, the decoder of the autoencoder 110-1 decodes the encoded data encoded by the encoder to be the decoded data so that the decoded data is brought closer to the learning data corresponding to the label "1" that is erroneously recognized output from the DL 100-1. By performing such encoding, the decoded data output from the decoder of the autoencoder 110-1 can be prevented from being reconstructed to be the decoded data corresponding to the label of correctness "7" due to erroneous recognition by the DL 100-1. Due to this, a difference between the test data and the decoded data is increased, so that the reconstruction error output from the autoencoder 110-1 is also increased.

On the other hand, the DL 100-2 that has performed learning with the data set DT2 can output the label of correctness corresponding to the character image "7" as the recognition result. In cooperation with this, the decoder of the autoencoder 110-2 decodes the encoded data encoded by the encoder to be the decoded data so that the decoded data is brought closer to the learning data corresponding to the label "7" output from the DL 100-2. Due to this, a difference between the test data and the decoded data is reduced, so that the reconstruction error output from the autoencoder 110-2 is also reduced.

Even in a case in which there are a plurality of DLs 100 that can output the label of correctness "7" as described above, by inputting the output result of the DL 100 to the decoder of the autoencoder 110 as a trigger for decoding, the reconstruction error output by the autoencoder 110-1 can be relatively increased, the autoencoder 110-1 in which the output from the DL 100-1 including the erroneously recognized label is input to the decoder, while the reconstruction error output by the autoencoder 110-2 can be relatively reduced, the autoencoder 110-2 in which the output from the DL 100-2 including the recognized label of correctness is input to the decoder. Thus, in a case in which the test data of the character image "7" is input, by selecting the DL 100-2 the reconstruction error of which is relatively small out of the DL 100-1 and the DL 100-2, the output result of the DL 100-2 that can correctly classify the label corresponding to the character image "7" can be selected.

Aspect of Effect

As described above, with the identification device 1 according to the present embodiment, the output from the wrong learning model can be prevented from being selected, so that a possibility of failing in recognition can be lowered. As a result, sequential learning using a plurality of learning models generated from pieces of learning data of different data sets can be implemented. Due to this, larger variety of recognition functions can be provided as compared with a case of individually using each learning model. For example, by combining recognition results of product data of company A and product data of company B, whether a given image of test data is a product of company A or a product of company B can be determined, and a product name thereof can be recognized. As a result, a wider range of recognition result can be provided to the customer as compared with the recognition result implemented with the learning data provided by the customer.

Second Embodiment

In the first embodiment described above, described is an example of selecting, from output results of a plurality of learning models, the output result of the learning model to be output as the recognition result based on the reconstruction error of each autoencoder, but the selected output result of the learning model is not always caused to be a final output. In the present embodiment, the following describes an example of calculating and outputting adaptability of the output from the learning model to the test data based on the reconstruction error output from the autoencoder.

FIG. 11 is a diagram illustrating an example of functional configurations of devices included in an adaptability calculation system according to a second embodiment. An adaptability calculation system 2 illustrated in FIG. 11 includes a learning device 20 and an adaptability calculation device 200.

Configuration of Learning Device 20

As illustrated in FIG. 11, the learning device 20 includes a learning data input unit 21, a DL learning unit 22, a DL storage unit 22A, an autoencoder (hereinafter, referred to as an "AE" in some cases) learning unit 23, and an AE storage unit 23A.

The learning data input unit 21 inputs the learning data to a functional unit at a succeeding stage. A customer to which a service of machine learning business is provided is an example of a source to which the learning data is provided. As an aspect, the learning data input unit 21 can acquire the learning data from an external device connected to the learning device 20, for example, a computer on a customer side via a network. As another aspect, the learning data input unit 21 can acquire the learning data from a removable medium such as a universal serial bus (USB) memory, an external HDD, and a memory card via an interface. In addition, the learning data input unit 21 inputs each learning sample included in the data set of the learning data to the DL learning unit 22 and to the AE learning unit 23.

The DL learning unit 22 performs model learning of the DL. The DL is merely an example of the model. The model is not always the DL, and may be the NN. As one embodiment, every time the learning sample is input from the learning data input unit 21, the DL learning unit 22 inputs the learning sample to the neuron of the input layer of the DL. The DL learning unit 22 then learns parameters such as a bias and the weight of the synapse of the DL using an algorithm such as backpropagation based on an error between the output from the neuron of the output layer of the DL and the label of correctness of the learning sample. In this way, the DL learning unit 22 repeatedly learns the parameters until the input of the learning sample from the learning data input unit 21 is ended, and further repeatedly learns the parameters until the number of times of learning of the data set reaches a predetermined number of epochs. Thereafter, the DL learning unit 22 stores, in the DL storage unit 22A, model information including the parameters such as the weight of the synapse and the bias obtained as a result of model learning of the DL.

The DL storage unit 22A stores the model information of the DL. For example, the model information of the DL includes a layer structure of the model such as a neuron and a synapse of each of an input layer, an intermediate layer, and an output layer constituting the DL, parameters of the model such as a bias and weight of each layer of the DL learned by the DL learning unit 22, and the like.

The AE learning unit 23 performs model learning of the AE, that is, the autoencoder. By way of example, to the AE, set is a layer structure of the model including the encoder corresponding to the NN that compresses the learning data into feature expression the dimension of which is reduced from the dimension of the learning data, and the decoder corresponding to the NN that receives the output from the encoder as an input and reconstructs original learning data from the feature expression.

As one embodiment, every time the learning sample is input from the learning data input unit 21, the AE learning unit 23 inputs the learning sample to the encoder of the AE. Thereafter, the AE learning unit 23 inputs the output from the encoder of the AE to the decoder of the AE, and inputs, to the decoder of the AE, the output from the DL to which the same learning sample is input. In this way, not only the output from the encoder of the AE but also the output from the DL is input to the decoder of the AE as a trigger for decoding. For example, the AE learning unit 23 causes the decoder to perform operation of reconstructing data corresponding to original dimensionality from the feature expression the dimensionality of which is compressed by the encoder so that the data is brought closer to the learning data corresponding to the label having the largest certainty factor among certainty factors output from the DL for each label. Due to this, learning of the AE can be implemented so that original learning data is hardly reconstructed at the time when the DL fails in classification and erroneous recognition is caused. Thereafter, the AE learning unit 23 learns parameters such as a bias and the weight of the synapse of the AE using an algorithm such as backpropagation based on the reconstruction error between the output from the decoder of the AE and the learning sample. In this way, the AE learning unit 23 repeatedly learns the parameters until input of the learning sample from the learning data input unit 21 is ended, and further repeatedly learns the parameters until the number of times of learning of the data set reaches a predetermined number of epochs. Thereafter, the AE learning unit 23 stores, in the AE storage unit 23A, model information including the parameters such as the weight of the synapse and the bias obtained as a result of model learning of the AE.

The AE storage unit 23A stores the model information of the AE. For example, the model information of the AE includes a layer structure of the model such as a neuron and a synapse of each of an input layer, an intermediate layer, and an output layer constituting the AE, parameters of the model such as a bias and weight of each layer of the AE learned by the AE learning unit 23, and the like.

Configuration of adaptability calculation device 200

As illustrated in FIG. 11, the adaptability calculation device 200 includes a test data input unit 210, a recognition unit 220, an encoding unit 230, a calculation unit 240, and an output unit 250.

The test data input unit 210 inputs the test data to a functional unit at a succeeding stage. A customer to which a service of machine learning business is provided is an example of a source to which the test data is provided, but the source is not limited thereto. For example, in a case in which a service provider of machine learning business accepts data such as an image and voice as a request, and provides a cloud service for outputting a result of image recognition and voice recognition as a different service, a customer of the different service may be assumed to be the source of the test data. As an aspect, the test data input unit 210 can acquire the test data from an external device connected to the adaptability calculation device 200, for example, an optional computer via a network. In addition, the test data input unit 210 inputs the test data to the recognition unit 220, and to the encoding unit 230.

The recognition unit 220 performs various types of recognition based on the output from the DL. As one embodiment, the recognition unit 220 develops the model of the DL in a work area of a memory (not illustrated) in accordance with the model information of the DL stored in the DL storage unit 22A. Thereafter, in a case in which the test data is input from the test data input unit 210, the recognition unit 220 inputs the test data to the neuron of the input layer of the DL. The recognition unit 220 recognizes the label of the test data based on the output from the neuron of the output layer of the DL, for example, the certainty factor for each label.

The encoding unit 230 performs encoding and decoding of the test data using the AE. As one embodiment, the encoding unit 230 develops the model of the AE in a work area of a memory (not illustrated) in accordance with the model information of the AE stored in the AE storage unit 23A. Thereafter, in a case in which the test data is input from the test data input unit 210, the encoding unit 230 inputs the test data to the encoder of the AE. Thereafter, the encoding unit 230 inputs, to the decoder of the AE, the output from the encoder of the AE, and inputs, to the decoder of the AE, the output from the DL to which the same learning sample is input. In this way, also in an aspect of recognition, not only the output from the encoder of the AE but also the output from the DL is input to the decoder of the AE as a trigger for decoding. For example, the encoding unit 230 causes the decoder to perform operation of reconstructing data corresponding to original dimensionality from the feature expression the dimensionality of which is compressed by the encoder so that the data is brought closer to the learning data corresponding to the label having the largest certainty factor among certainty factors output by the DL for each label. Thereafter, the encoding unit 230 calculates the reconstruction error from an error between the output from the decoder of the AE and the test data.

In this way, by inputting the output from the DL to the decoder of the AE, original test data is hardly reconstructed at the time when the DL fails in classification and erroneous recognition is caused, so that the reconstruction error can be calculated to be larger at the time when the test data is erroneously recognized as compared with the reconstruction error at the time of successful recognition.

The calculation unit 240 calculates adaptability of the output from the DL to the test data. As one embodiment, the calculation unit 240 calculates the adaptability based on the reconstruction error output from the AE executed by the encoding unit 230. Herein, a value of the reconstruction error is calculated to be smaller as the test data is more similar to the learning data, while the adaptability is an indicator representing that the output from the DL is more adapted to the test data as a value thereof is larger. Due to this, by way of example, the calculation unit 240 calculates the adaptability described above by performing normalization calculation using an inverse number of the reconstruction error output from the AE, for example, "0.1/reconstruction error". Described herein is an example of calculating a normalized reconstruction error as the adaptability, but obviously, the reconstruction error itself can be derived as the adaptability.

The output unit 250 outputs various recommendations for the test data. As an aspect, the output unit 250 can output the adaptability itself calculated by the calculation unit 240, and can output a comparison result between the adaptability and a threshold. For example, in a case in which the adaptability is equal to or larger than the threshold, the output unit 250 outputs, to a predetermined output destination, for example, a transmission source of the test data, a message that the test data can be recognized, and a message that there is a model of the DL that can recognize the test data or a name of a service that uses the DL.

Described herein is an example of calculating the adaptability of one DL. Alternatively, in a case in which the model information of a plurality of DLs is stored in the DL storage unit 22A, the adaptability to the test data may be calculated for each output from the DLs. In this case, the adaptability of the output from each DL can be output, or the DL from which the largest adaptability is calculated or a service name thereof can be output.

SECOND SPECIFIC EXAMPLE

The following describes a specific example of calculating the adaptability with reference to FIG. 12 to FIG. 18. FIG. 12 is a diagram illustrating an example of the learning data. A "learning IDentification (ID)" illustrated in FIG. 12 indicates identification information for identifying the learning data. A "data label" indicates a label of correctness given to the learning data. A "data main body" indicates data itself input to the DL or the AE. As an example of this data, FIG. 12 illustrates data of a character image. As the learning data identified with the learning ID "TR1", FIG. 12 illustrates a learning sample of data of a character image "I11" to which a character label "1" is given, and a learning sample of data of a character image "I12" to which a character label "7" is given.

FIG. 13 is a diagram illustrating an example of the test data. A "test ID" illustrated in FIG. 13 indicates identification information for identifying the test data. The label is not given to the test data, so that a space of the "data label" is blank in FIG. 13. In a space of "data visualization", for convenience of explanation, illustrated is an image obtained by visualizing the data of the character image. As illustrated in FIG. 13, the test data identified with the test ID "TT1" includes the image data "I1'", which means that the image "1" is displayed when the image data "I1'" is visualized. The test data identified with the test ID "TT2" includes the image data "I2'", which means that the image "7" is displayed when the image data "I2'" is visualized. The test data identified with the test ID "TT3" includes the image data "I3'", which means that the image "I" is displayed when the image data "I3'" is visualized.

The following describes a case in which the learning data TR1 is learned by the model of the DL and the model of the AE, and a DL 100A and an AE 110A are generated.

FIG. 14 is a diagram illustrating an example of recognition results of the DL. FIG. 14 illustrates a recognition result of the DL 100A for each of three pieces of test data having test IDs "TT1" to "TT3" illustrated in FIG. 13. As illustrated in FIG. 14, in a case in which the image data "I1'" having the test ID "TT1" is input to the input layer of the DL 100A, the label "1" having the largest certainty factor "0.8" out of certainty factors of the label "1" and the label "7" output from the output layer of the DL 100A is output as the recognition result. In a case in which the image data "I2'" having the test ID "TT2" is input to the input layer of the DL 100A, the label "1" having the largest certainty factor "0.9" out of the certainty factors of the label "1" and the label "7" output from the output layer of the DL 100A is output as the recognition result. In a case in which the image data "I3'" having the test ID "TT3" is input to the input layer of the DL 100A, the label "1" having the largest certainty factor "0.9" out of the certainty factors of the label "1" and the label "7" output from the output layer of the DL 100A is output as the recognition result.

In this way, even when any of the three pieces of test data TT1 to TT3 illustrated in FIG. 13 is input to the DL 100A, the label "1" is output as the recognition result from the recognition unit 220 as illustrated in FIG. 14. As illustrated in FIG. 13, images obtained by visualizing the three pieces of image data having the test IDs "TT1" to "TT3" are "1", "7", and "I", respectively.

Thus, by analyzing three instances based on the result, it can be found that only the test data TT1 can be successfully recognized, and the test data TT2 and the test data TT3 are erroneously recognized as the label "1". It can be found that a condition for proving that the adaptability for correctly representing the three instances can be calculated is that the adaptability of the DL 100A to the test data TT1 can be calculated to be higher than the adaptability of the DL 100A to the test data TT2 and the test data TT3.

FIG. 15 is a diagram illustrating an example of output results of the AE. FIG. 15 illustrates the calculation result of the reconstruction error of the AE 110A for each of the three pieces of test data TT1 to TT3 illustrated in FIG. 13. FIG. 16 is a diagram illustrating an example of calculation results of adaptability. FIG. 16 illustrates the calculation result of adaptability calculated from the reconstruction error illustrated in FIG. 15 for each of the three pieces of test data TT1 to TT3 illustrated in FIG. 13.

As illustrated in FIG. 15, in a case in which the image data "I1'" having the test ID "TT1" is input to the encoder of the AE 110A, the output from the DL 100A, the label "1" in this example, is input to the decoder of the AE 110A in addition to the output from the encoder of the AE 110A. As a result, the decoded data reconstructed in accordance with the label "1" is output from the decoder of the AE 110A. The image obtained by visualizing the decoded data is an image close to "1" in accordance with the label as illustrated in FIG. 15. Additionally, the encoding unit 230 outputs the reconstruction error "0.1" calculated from an error between the decoded data output from the decoder of the AE 110A and the image data "I1'" having the test ID "TT1". By way of example, the reconstruction error is calculated by calculating the square of a difference between pixel values for each pair of pixels the positions of which correspond to each other between two pieces of image data, and performing predetermined statistical processing, for example, averaging processing, on the square of the difference between pixel values calculated for each pair of pixels. In a case in which the reconstruction error "0.1" calculated from the test data TT1 is input to the calculation unit 240, the adaptability is calculated to be "1.00 (=0.1/0.1)" as illustrated in FIG. 16.

Next, in a case in which the image data "I2'" having the test ID "TT2" is input to the encoder of the AE 110A, the output from the DL 100A, the label "1" in this example, is input to the decoder of the AE 110A in addition to the output from the encoder of the AE 110A. As a result, the decoded data reconstructed in accordance with the label "1" is output from the decoder of the AE 110A. The image obtained by visualizing the decoded data is an image close to "1" in accordance with the label as illustrated in FIG. 15. Additionally, the encoding unit 230 outputs the reconstruction error "0.4" calculated from an error between the decoded data output from the decoder of the AE 110A and the image data "I2'" having the test ID "TT2". In a case in which the reconstruction error "0.4" calculated from the test data TT2 is input to the calculation unit 240, the adaptability is calculated to be "0.25 (=0.1/0.4)" as illustrated in FIG. 16.

In a case in which the image data "I3'" having the test ID "TT3" is input to the encoder of the AE 110A, the output from the DL 100A, the label "1" in this example, is input to the decoder of the AE 110A in addition to the output from the encoder of the AE 110A. As a result, the decoded data reconstructed in accordance with the label "1" is output from the decoder of the AE 110A. The image obtained by visualizing the decoded data is an image close to "1" in accordance with the label as illustrated in FIG. 15. Additionally, the encoding unit 230 outputs the reconstruction error "0.3" calculated from an error between the decoded data output from the decoder of the AE 110A and the image data "I3'" having the test ID "TT3". In a case in which the reconstruction error "0.3" calculated from the test data TT3 is input to the calculation unit 240, the adaptability is calculated to be "0.33 . . . (=0.1/0.3)" as illustrated in FIG. 16.

In this way, the adaptability of the DL 100A to the test data TT1 can be calculated to be higher than the adaptability of the DL 100A to the test data TT2 and the test data TT3. Due to this, it can be found that the adaptability correctly representing the instance of the recognition result of the DL 100A for the three pieces of test data TT1 to TT3 can be calculated in the present embodiment.

The following describes an aspect of a mechanism for calculating the adaptability correctly representing the three instances described above.

(1) Test Data TT1

The test data TT1 is data belonging to a category in which the label is present in the data set of the learning data TR1. In this case, there is a high possibility that the learning sample included in the data set of the learning data TR1 includes image data similar to the image data "I1'" of the test data TT1, for example, the image data "I11" of the character image having the label "1" illustrated in FIG. 12. This fact works for enhancing reproducibility of reconstructing the original image data "I1'" after compressing the image data "I1'" having the test ID "TT1" by the AE 110A. Additionally, in a case in which the DL 100A succeeds in recognition, the label "1" output from the DL 100A as the recognition result corresponds to the category into which the test data TT1 is desired to be classified. Thus, reproducibility of the original image data "I1'" of the test data TT1 is not deteriorated due to input of the label output from the DL 100A to the decoder of the AE 110A. Accordingly, as the adaptability of the DL 100A to the test data TT1, a high value of "1.0" can be obtained.

(2) Test Data TT3

The test data TT3 is data belonging to a category in which the label is not present in the data set of the learning data TR1. In this case, there is a high possibility that image data similar to the image data "I3'" of the test data TT3 is not included in the learning sample included in the data set of the learning data TR1. This fact works for deteriorating reproducibility of reconstructing the original image data "I3'" after compressing the image data "I3'" having the test ID "TT3" by the AE 110A. Due to this, as the adaptability of the DL 100A to the test data TT3, a value "0.33" lower than the adaptability "1" of the DL 100A to the test data TT1 can be obtained.

(3) Test Data TT2

Similarly to the test data TT1, the test data TT2 is also data belonging to a category in which the label is present in the data set of the learning data TR1. In this case, there is a high possibility that image data similar to the image data "I2'" of the test data TT2, for example, the image data "I12" of the character image having the label "7" illustrated in FIG. 12 is included in the learning sample included in the data set of the learning data TR1. This fact works for enhancing reproducibility of reconstructing the original image data "I2'" after compressing the image data "I2'" having the test ID "TT2" by the AE 110A. This fact may reduce the reconstruction error. However, as illustrated in FIG. 14, the DL 100A erroneously classifies the test data TT2 into a class corresponding to the label "1" although the test data TT2 needs to be classified into a class corresponding to the label "7".

Accordingly, as in the present embodiment, in a case in which the test data TT2 is input to the AE 110A, the reconstruction error may be calculated to be small even in a case in which the DL 100A fails in recognition if the output from the DL 100A is not input to the decoder of the AE 110A. That is, the adaptability corresponding to an authentication result of the DL 100A can be calculated in the two instances in which the test data TT1 and the test data TT3 are input to the AE 110A, while the adaptability not corresponding to the authentication result of the DL 100A is calculated in the instance in which the test data TT2 is input to the AE 110A. In this way, reliability of the adaptability calculated in some instances may be lowered.

In the following description, a difference in adaptability calculated by the calculation unit 240 is compared between the AE 110A in which the output from the DL 100A is input to the decoder and an AE 110A' in which the output from the DL 100A is not input to the decoder.

FIG. 17 is a diagram illustrating an example of output results of AE. FIG. 17 illustrates a calculation result of the reconstruction error of the AE 110A' for each of the three pieces of test data TT1 to TT3 illustrated in FIG. 13. FIG. 18 is a diagram illustrating an example of calculation results of the adaptability. FIG. 18 illustrates the calculation result of the adaptability calculated from the reconstruction error of the AE 110A' illustrated in FIG. 17 for each of the three pieces of test data TT1 to TT3 illustrated in FIG. 13.

Comparing FIG. 15 with FIG. 17, in a case in which the test data TT1 and the test data TT3 are input from among the three pieces of test data TT1 to TT3, it can be found that there is no difference between the reconstruction error calculated by the AE 110A and the reconstruction error calculated by the AE 110A'. On the other hand, in a case in which the test data TT2 is input, it can be found that the reconstruction error "0.1" calculated by the AE 110A' is smaller than the reconstruction error "0.4" calculated by the AE 110A.

The reason why the reconstruction error calculated by the AE 110A' is smaller than the reconstruction error calculated by the AE 110A is that only the output from the encoder of the AE 110A' is input to the decoder of the AE 110A' while the output from the DL 100A is not input thereto.

As described above, the test data TT2 is data belonging to a category in which the label is present in the data set of the learning data TR1. Thus, the AE 110A' can reconstruct the original image data "I2'" having the test ID "TT2" at a level equivalent to a case in which the original image data "I1'" having the test ID "TT1" is reconstructed. On the other hand, the output from the DL 100A is not input to the decoder of the AE 110A', so that there is no penalty for the reconstruction error for reconstructing the data to be closer to the learning data corresponding to the label "1" output from the DL 100A. As a result, the decoder of the AE 110A' outputs the decoded data reconstructed to be image data close to the original image data "I2'" having the test ID "TT2". That is, as illustrated in FIG. 17, the image obtained by visualizing the decoded data output from the decoder of the AE 110A' is reconstructed in a state in which a feature of the character "7" included in the original image data "I2'" having the test ID "TT2" is stored, so that the reconstructed image is similar to the image "7" obtained by visualizing the image data "I2'" having the test ID "TT2". As a result, a value "0.1" that is smaller than the reconstruction error "0.4" of the AE 110A is calculated as the reconstruction error of the AE 110A' based on an error between the decoded data output from the decoder of the AE 110A' and the image data "I2'" having the test ID "TT2". In addition, in a case in which the reconstruction error "0.1" calculated from the test data TT2 is input to the calculation unit 240, the adaptability is calculated to be "1 (=0.1/0.1)" as illustrated in FIG. 18.

On the other hand, the output from the DL 100A is input to the decoder of the AE 110A as a trigger for decoding in addition to the output from the encoder of the AE 110A. At this point, as illustrated in FIG. 14, the DL 100A erroneously classifies the test data TT2 into a class corresponding to the label "1" although the test data TT2 needs to be classified into a class corresponding to the label "7". In this way, in a case in which the DL 100A performs erroneous recognition, the label "1" output from the DL 100A as the recognition result does not correspond to the category into which the test data TT2 is desired to be classified. In this case, the data is decoded to be closer to the learning data corresponding to the label "1" output from the DL 100A. As a result, the decoder of the AE 110A is unable to reconstruct the image data to be close to the original image data "I2'" having the test ID "TT2". That is, the image obtained by visualizing the decoded data output from the decoder of the AE 110A is reconstructed to be closer to the image "1" obtained by visualizing the image data "I11" of the learning sample to which the label "1" is given as illustrated in FIG. 15. Due to this, a feature of the character "7" included in the image data "I2'" having the test ID "TT2" is lost from the image obtained by visualizing the decoded data output from the decoder of the AE 110A. Accordingly, the image "1" obtained by visualizing the decoded data output from the decoder of the AE 110A is not similar to the image "7" obtained by visualizing the image data "I2'" having the test ID "TT2". As a result, a value "0.4" that is larger than the reconstruction error "0.1" of the AE 110A' is calculated as the reconstruction error of the AE 110A based on the error between the decoded data output from the decoder of the AE 110A and the image data "I2'" having the test ID "TT2". In this way, when the output from the DL 100A is input to the decoder of the AE 110A as a trigger for decoding, a penalty is imposed on the reconstruction error of the AE 110A at the time of erroneous recognition by the DL 100A. In addition, in a case in which the reconstruction error "0.4" calculated from the test data TT2 is input to the calculation unit 240, the adaptability is calculated to be "0.25 (=0.1/0.4)" as illustrated in FIG. 16.

In this way, in a case in which the DL 100A erroneously recognizes the test data TT2 even when the test data TT2 belonging to the category in which the label is present in the data set of the learning data TR1 is input to the AE 110A, a penalty is imposed on the reconstruction error. As a result, the adaptability not corresponding to the authentication result of the DL 100A can be prevented from being calculated, so that reliability of the adaptability can be prevented from being lowered in the instance in which the test data TT2 is input.

Processing Procedure

Next, the following describes a processing procedure of the adaptability calculation system according to the present embodiment. The following first describes (1) learning processing performed by the learning device 20, and then describes (2) adaptability calculation processing performed by the adaptability calculation device 200.

(1) Learning Processing

Figure 19:
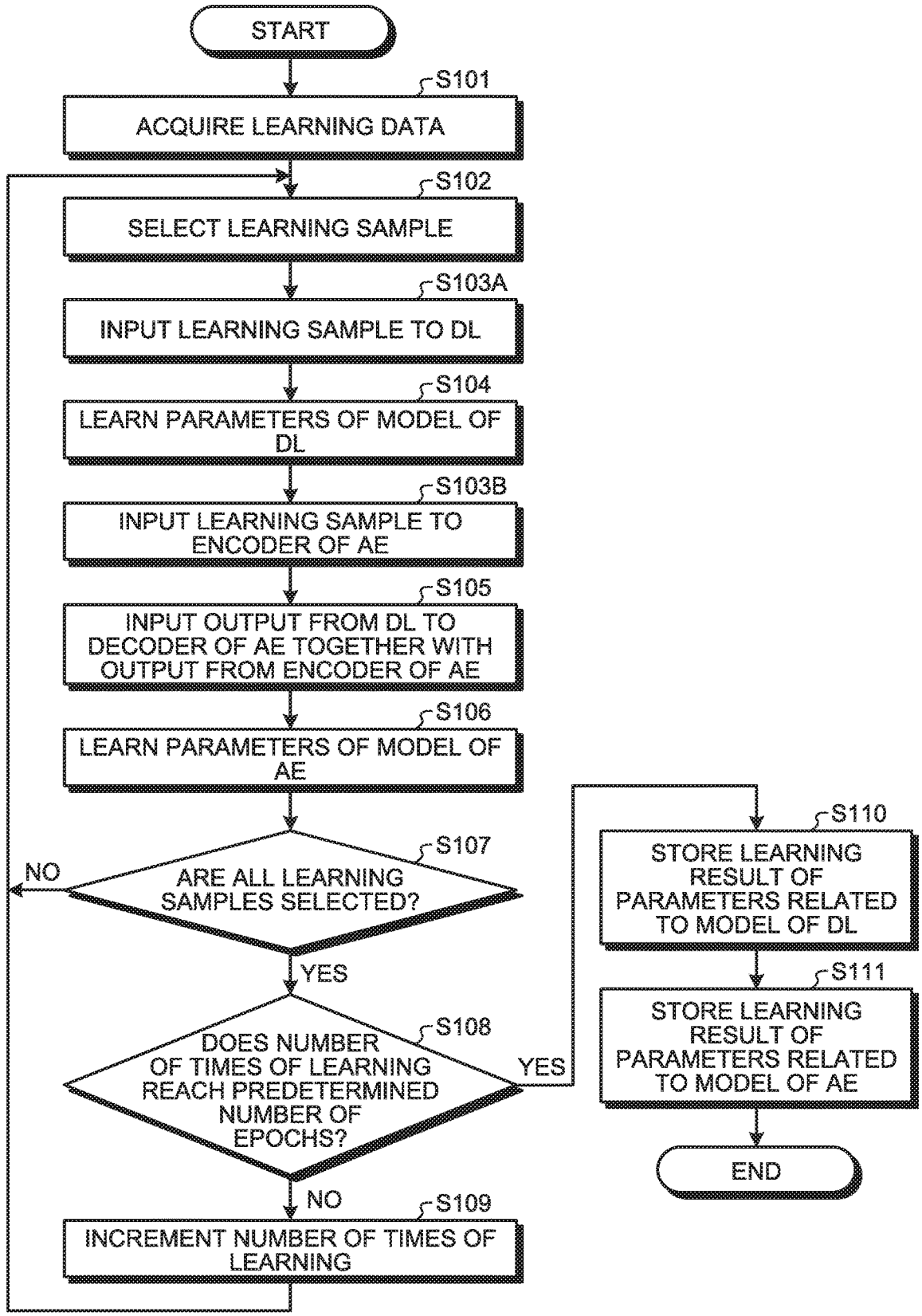
FIG. 19 is a flowchart illustrating a procedure of learning processing according to the second embodiment.

FIG. 19 is a flowchart illustrating a procedure of learning processing according to the second embodiment. By way of example, this processing starts when the learning data input unit 21 acquires the learning data. As illustrated in FIG. 19, when the learning data is acquired (Step S101), the learning data input unit 21 selects one of learning samples included in the data set of the learning data (Step S102).

Subsequently, the learning data input unit 21 inputs the learning sample selected at Step S102 to the model of the DL (Step S103A). The DL learning unit 22 then learns parameters of the model such as a bias and the weight of the synapse of the DL based on an error between the label of correctness of the learning sample and the output from the model of the DL obtained by inputting the learning sample to the model of the DL at Step S103A (Step S104).

The learning data input unit 21 inputs the learning sample selected at Step S102 to the encoder of the AE (Step S103B). Subsequently, the AE learning unit 23 inputs, to the decoder of the AE, the output from the encoder of the AE obtained by inputting the learning sample to the encoder of the AE at Step S103B, and inputs, to the decoder of the AE, the output from the model of the DL obtained by inputting the learning sample to the model of the DL at Step S103A, for example, a label or a label having the largest certainty factor (Step S105). The AE learning unit 23 learns parameters of the model such as a bias and the weight of the synapse of the AE based on the reconstruction error between the output from the decoder of the AE and the learning sample (Step S106).

Subsequently, until all learning samples included in the data set of the learning data are selected (No at Step S107), the processing from Step S102 to Step S106 described above is repeatedly performed.

Thereafter, if all the learning samples are selected (Yes at Step S107), until the number of times of learning reaches a predetermined number of epochs (No at Step S108), a counter of the number of times of learning is incremented (Step S109), and the processing from Step S102 to Step S107 described above is repeatedly performed.

If the number of times of learning reaches the predetermined number of epochs (Yes at Step S108), the leaning result of parameters related to the model of the DL is stored in the DL storage unit 22A, the learning result of parameters related to the model of the AE is stored in the AE storage unit 23A (Step S110 and Step S111), and the processing ends.

When learning of the DL is previously performed, learning of the AE can be more effectively performed. Specifically, only learning of the DL is performed on a predetermined number of samples from the start of processing, and learning of both of the DL and the AE is performed on samples succeeding the predetermined number of samples. By performing learning of the AE in a state in which learning of the DL has progressed, the number of epochs until reaching a predetermined error can be reduced, and a learning time can be shortened. A plurality of samples may be collectively processed by the adaptability calculation system.

(2) Adaptability Calculation Processing

Figure 20:
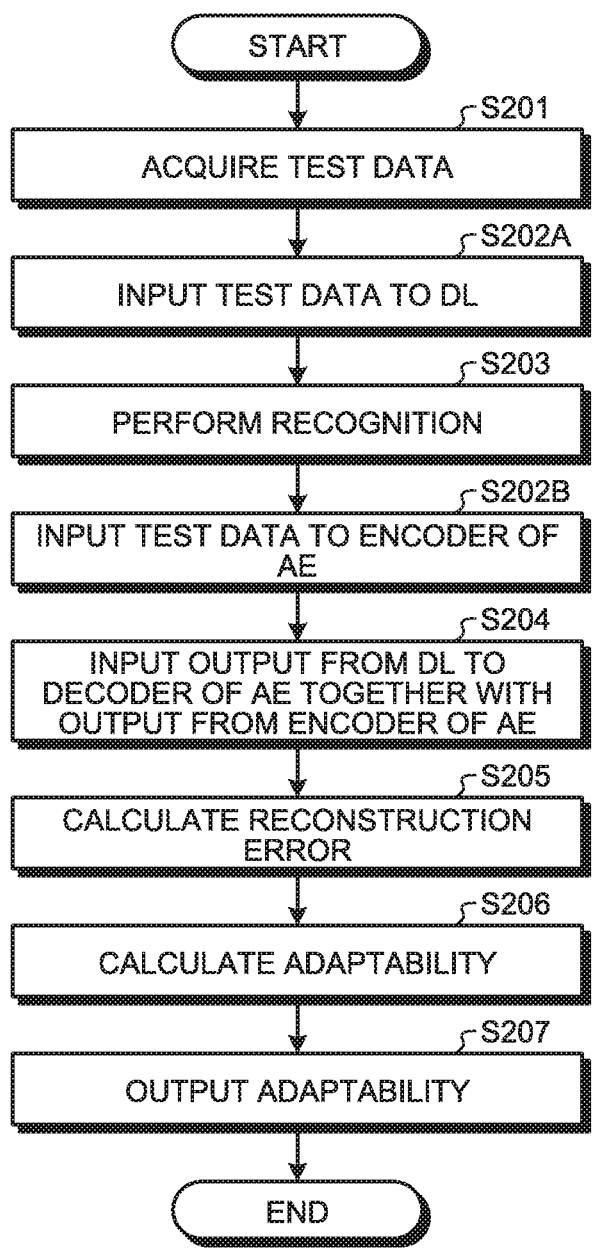
FIG. 20 is a flowchart illustrating a procedure of adaptability calculation processing according to the second embodiment.

FIG. 20 is a flowchart illustrating a procedure of adaptability calculation processing according to the second embodiment. By way of example, this processing starts when the test data input unit 210 acquires the test data.

As illustrated in FIG. 20, when the test data is acquired (Step S201), the test data input unit 210 inputs the test data to the model of the DL (Step S202A). The recognition unit 220 performs classification, that is, recognition, based on the output from the model of the DL obtained by inputting the test data to the model of the DL at Step S202A (Step S203).

The test data input unit 210 inputs the test data to the encoder of the AE (Step S202B). Subsequently, the encoding unit 230 inputs, to the decoder of the AE, the output from the encoder of the AE obtained by inputting the test data to the encoder of the AE at Step S202B, and inputs, to the decoder of the AE, the output from the model of the DL obtained by inputting the test data to the model of the DL at Step S202A, for example, a label or a label having the largest certainty factor (Step S204). The encoding unit 230 calculates the reconstruction error based on the test data and the output from the decoder of the AE obtained as a result of Step S204 (Step S205).

Subsequently, the calculation unit 240 calculates the adaptability based on the reconstruction error calculated at Step S205 (Step S206), the output unit 250 outputs the adaptability calculated at Step S206 to a predetermined output destination (Step S207), and the processing ends.

Aspect of Effect

As described above, the adaptability calculation device 200 according to the present embodiment calculates and outputs the adaptability of the output from the learning model to the test data based on the reconstruction error output from the autoencoder. Thus, the adaptability calculation device 200 according to the present embodiment can output the adaptability of the output from the learning model to the test data. By using the adaptability, provided are a basis for determining whether the test data can be recognized, and whether there is a learning model that can recognize the test data, and a service name using the learning model that can recognize the test data.

In the second embodiment described above, described is an example in which the output from the model of the DL is input to the decoder of the AE at the time of learning of the model of the AE, but the embodiment is not limited thereto. For example, a label given to the learning sample at the time of learning of the model of the AE may be input to the decoder of the AE. In this way, when the label given to the learning sample is input to the decoder of the AE, there is no need to wait for a data input to the decoder of the AE until the output from the model of the DL is obtained, so that the model learning of the DL and the model learning of AE can be performed in parallel.

In the second embodiment described above, described is a specific example in a case of learning and recognizing the character image using FIG. 12 to FIG. 18. Alternatively, the processing illustrated in FIG. 19 and FIG. 20 can be applied to other types of images and moving images, and to other media data such as voice.

In the second embodiment described above, described is an example in which the AE reconstructs the entire learning data or test data. Alternatively, in a case in which there is a need for reduction in throughputs, real-time performance, and the like, the configuration of the encoder and the decoder of the AE can be modified to reconstruct part of the learning data or the test data. For example, in a case of an image, a predictor that predicts the next frame based on a current frame can be used as the autoencoder.

Third Embodiment

In the present embodiment, described is an example of selecting, from output results of a plurality of learning models, the output result of the learning model that is output as the recognition result based on the adaptability calculated for each reconstruction error output from the respective autoencoders that have performed learning with the same learning data as the respective learning models.

Figures 21, 22:
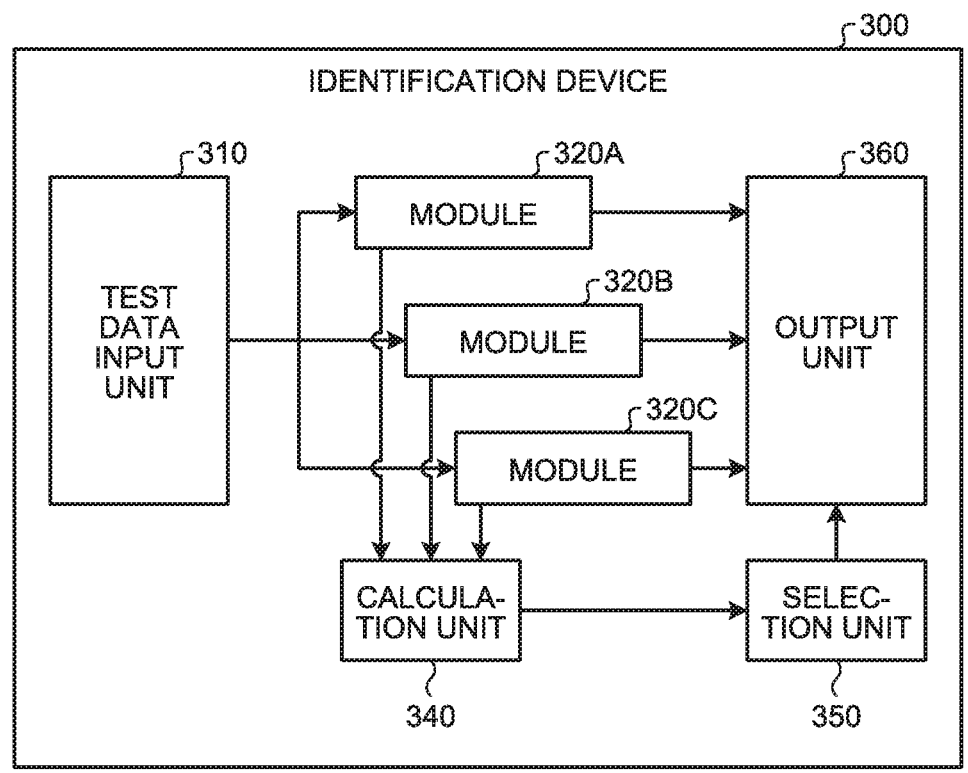
FIG. 21 is a block diagram illustrating an example of a functional configuration of an identification device according to a third embodiment.
FIG. 22 is a diagram illustrating an example of learning data used for model learning of a module.

FIG. 21 is a block diagram illustrating an example of a functional configuration of an identification device according to a third embodiment. As illustrated in FIG. 21, an identification device 300 includes a test data input unit 310, modules 320A to 320C, a calculation unit 340, a selection unit 350, and an output unit 360. FIG. 21 illustrates an example in which the identification device 300 includes the three modules 320A to 320C, but this is merely an example. The identification device 300 may include two, or four or more modules 320.

The test data input unit 310 inputs the test data to a functional unit at a succeeding stage. A customer to which a service of machine learning business is provided is an example of a source to which the test data is provided, but the source is not limited thereto. For example, in a case in which a service provider of machine learning business accepts data such as an image and voice as a request, and provides a cloud service for outputting a result of image recognition and voice recognition as a different service, a customer of the different service may be assumed to be the source of the test data. As an aspect, the test data input unit 310 can acquire the test data from an external device connected to the identification device 300, for example, an optional computer via a network. In addition, the test data input unit 310 inputs the test data to the modules 320A to 320C.

The modules 320A to 320C are functional units obtained by modularizing functions of the recognition unit 220 and the encoding unit 230 illustrated in FIG. 11.

In this case, the parameters of the model of the DL and the model of the AE executed by each module 320, that is, the modules 320A to 320C, are individually learned from pieces of learning data of different data sets by the learning device 20 illustrated in FIG. 11. That is, the learning device 20 individually learns the parameters of the model of the DL and the model of the AE from pieces of learning data of different data sets. Thereafter, in the learning device 20, model information of the DL is stored in the DL storage unit 22A for each learning ID, and model information of the AE is stored in the AE storage unit 23A for each learning ID. In addition, the model of the DL and the model of the AE stored for each learning ID are assigned to the modules 320A to 320C. Thereafter, the modules 320A to 320C read out the model information of the DL and the model information of the AE assigned to each module 320 from the DL storage unit 22A and the AE storage unit 23A, and executes the model of the DL and the model of the AE to implement the functions of the recognition unit 220 and the encoding unit 230 illustrated in FIG. 11.

The calculation unit 340 calculates the adaptability of the output from the DL to the test data for each module 320. As one embodiment, the calculation unit 340 calculates, for each module 320, the adaptability based on the reconstruction error output from the AE executed by each module 320. For example, the calculation unit 340 performs normalization calculation using an inverse number of the reconstruction error output from the AE, for example, "0.1/reconstruction error", to calculate the adaptability described above. Described herein is an example in which each module 320 outputs the reconstruction error and the calculation unit 340 calculates the adaptability. Alternatively, the adaptability may be calculated by each module 320.

The selection unit 350 selects any of the outputs from the modules 320A to 320C. As one embodiment, the selection unit 350 selects, from among output results of the DL output for each of the modules 320A to 320C, the output result of the DL of the module 320 from which the largest adaptability is calculated by the calculation unit 340.

The output unit 360 outputs a recognition result. As one embodiment, the output unit 360 outputs, from among the output results of the DL output for each of the modules 320A to 320C, the output result of the DL of the module 320 selected by the selection unit 350 to a predetermined output destination as the recognition result. For example, in a case in which the test data is input as a request for authentication from an external client terminal, the client terminal can be caused to be the output destination. Additionally, a service or an application executed in a back end, AI, an external device of the identification device 300, and the like may be caused to be the output destination.

THIRD SPECIFIC EXAMPLE

The following describes a specific example of selecting the module with reference to FIG. 22 to FIG. 28. FIG. 22 is a diagram illustrating an example of the learning data used for model learning of the module. FIG. 22 illustrates the learning data using a schema similar to that of FIG. 12, and the data of the character image is illustrated as an example of the learning data similarly to the example of FIG. 12. As the learning data identified with the learning ID "TR1", FIG. 22 illustrates the learning sample of the data of the character image "I11" to which the character label "1" is given, and the learning sample of the data of the character image "I12" to which the character label "7" is given. Additionally, as the learning data identified with the learning ID "TR2", FIG. 22 illustrates the learning sample of the data of the character image "I21" to which the character label "I" is given, and the learning sample of the data of the character image "I22" to which the character label "7" is given.

FIG. 23 is a diagram illustrating an example of the test data. FIG. 23 illustrates the test data using a schema similar to that of FIG. 13. In FIG. 23, similarly to FIG. 13, the space of "data label" is blank, and an image obtained by visualizing the data of the character image is illustrated in the space of "data visualization" for convenience of explanation. As illustrated in FIG. 23, the test data identified with the test ID "TT1" includes the image data "I1'", which means that the image "1" is displayed when the image data "I1'" is visualized. The test data identified with the test ID "TT2" includes the image data "I2'", which means that the image "7" is displayed when the image data "I2'" is visualized. The test data identified with the test ID "TT3" includes the image data "I3'", which means that the image "I" is displayed when the image data "I3'" is visualized.

In the following description, a model of a DL 300A and a model of an AE 320A generated from the learning data TR1 are assumed to be assigned to the module 320A, and a DL 300B and an AE 320B generated from the learning data TR2 are assumed to be assigned to the module 320B.

FIG. 24 is a diagram illustrating an example of recognition results of the DL. FIG. 24 illustrates the recognition result of the DL 300A and the recognition result of the DL 300B for each of three pieces of test data having test IDs "TT1" to "TT3" illustrated in FIG. 23.

As illustrated in FIG. 24, in a case in which the image data "I1'" having the test ID "TT1" is input to the DL 300A of the module 320A, the label "1" having the largest certainty factor "0.8" out of certainty factors of the label "1" and the label "7" output from the output layer of the DL 300A is output as the recognition result. In a case in which the image data "I1'" having the test ID "TT1" is input to the DL 300B of the module 320B, the label "I" having the largest certainty factor "0.9" out of the certainty factors of the label "I" and the label "7" output from the output layer of the DL 300A is output as the recognition result.

In a case in which the image data "I2'" having the test ID "TT2" is input to the DL 300A of the module 320A, the label "1" having the largest certainty factor "0.9" out of the certainty factors of the label "1" and the label "7" output from the output layer of the DL 300A is output as the recognition result. In a case in which the image data "I2'" having the test ID "TT2" is input to the DL 300B of the module 320B, the label "7" having the largest certainty factor "0.8" out of the certainty factors of the label "I" and the label "7" output from the output layer of the DL 300B is output as the recognition result.

In a case in which the image data "I3'" having the test ID "TT3" is input to the DL 300A of the module 320A, the label "1" having the largest certainty factor "0.9" out of the certainty factors of the label "1" and the label "7" output from the output layer of the DL 300A is output as the recognition result. In a case in which the image data "I3'" having the test ID "TT3" is input to the DL 300B of the module 320B, the label "I" having the largest certainty factor "0.8" out of the certainty factors of the label "I" and the label "7" output from the output layer of the DL 300B is output as the recognition result.

From the result, the learning model that can correctly classify each of the pieces of test data TT1 to TT3 is the DL 300A for the test data TT1, the DL 300B for the test data TT2, and the DL 300B for the test data TT3. However, when the output from the learning model having the largest certainty factor is selected as in the related art, the output from the DL 300A is selected as the recognition result of the test data TT2 and the recognition result of the test data TT3. As a result, in the related art, the label of the test data TT2 is erroneously recognized as "1", or the label of the test data TT3 is erroneously recognized as "1".

On the other hand, in the present embodiment, the adaptability is calculated for each of the module 320A and the module 320B from the reconstruction error output from each of the AE 320A and the AE 320B for each of the module 320A and the module 320B, and the output from the module 320 from which the largest adaptability is calculated is selected, so that the module 320 that can correctly classify all the pieces of test data TT1 to TT3 can be selected.

FIG. 25 is a diagram illustrating an example of output results of the AE. FIG. 25 illustrates the calculation result of the reconstruction error of the AE 320A and the calculation result of the reconstruction error of the AE 320B for each of the three pieces of test data TT1 to TT3 illustrated in FIG. 23. FIG. 26 is a diagram illustrating an example of selection results of the module. FIG. 26 illustrates the selection result of the module 320 the adaptability of which is calculated to be the largest among adaptabilities that are calculated from the reconstruction error illustrated in FIG. 25 for each of the three pieces of test data TT1 to TT3 illustrated in FIG. 23.

As illustrated in FIG. 25, in a case in which the image data "I1'" having the test ID "TT1" is input to the encoder of the AE 320A of the module 320A, the output from the DL 300A, a correct label "1" in this example, is input to the decoder of the AE 320A in addition to the output from the encoder of the AE 320A. As a result, decoded data reconstructed in accordance with the correct label "1" is output from the decoder of the AE 320A. As illustrated in FIG. 25, an image obtained by visualizing this decoded data is an image close to "1" in accordance with the correct label, and similar to the image "1" obtained by visualizing the test data TT1. Due to this, the reconstruction error of the module 320A calculated from an error between the decoded data output from the decoder of the AE 320A and the image data "I1'" having the test ID "TT1" is a value "0.1" that is smaller than that at the time of erroneous recognition. In a case in which the reconstruction error "0.1" of the module 320A calculated from the test data TT1 is input to the calculation unit 340, as illustrated in FIG. 26, the adaptability is calculated to be "1.00 (=0.1/0.1)".

On the other hand, in a case in which the image data "I1'" having the test ID "TT1" is input to the encoder of the AE 320B of the module 320B, the output from the DL 300B, an erroneously recognized label "I" in this example, is input to the decoder of the AE 320B in addition to the output from the encoder of the AE 320B. As a result, decoded data reconstructed in accordance with the erroneously recognized label "I" is output from the decoder of the AE 320B. As illustrated in FIG. 25, an image obtained by visualizing this decoded data is an image close to "I" in accordance with the erroneously recognized label, and is not similar to the image "1" obtained by visualizing the test data TT1. Due to this, the reconstruction error of the module 320B calculated from an error between the decoded data output from the decoder of the AE 320B and the image data "I1'" having the test ID "TT1" is a value "0.3" that is larger than the reconstruction error "0.1" of the module 320A. In a case in which the reconstruction error "0.3" of the module 320B calculated from the test data TT1 is input to the calculation unit 340, the adaptability is calculated to be "0.33 . . . (=0.1/0.3)".

In this way, while the adaptability of the module 320A to the test data TT1 is calculated to be "1.00", the adaptability of the module 320B to the test data TT1 is calculated to be "0.33". As a result of comparison of the adaptability, the output from the DL 300A of the module 320A having a larger adaptability value is selected as the recognition result. Accordingly, the module 320A that can correctly classify the test data TT1 can be selected.

Next, in a case in which the image data "I2'" having the test ID "TT2" is input to the encoder of the AE 320A of the module 320A, the output from the DL 300A, an erroneously recognized label "1" in this example, is input to the decoder of the AE 320A in addition to the output from the encoder of the AE 320A. As a result, decoded data reconstructed in accordance with the erroneously recognized label "1" is output from the decoder of the AE 320A. As illustrated in FIG. 25, an image obtained by visualizing this decoded data is an image close to "1" in accordance with the erroneously recognized label, and is not similar to the image "7" obtained by visualizing the test data TT2. As a result, the reconstruction error of the module 320A calculated from an error between the decoded data output from the decoder of the AE 320A and the image data "I2'" having the test ID "TT2" is a value "0.4" that is larger than that at the time of correct recognition. In a case in which the reconstruction error "0.4" of the module 320A calculated from the test data TT2 is input to the calculation unit 340, the adaptability is calculated to be "0.25 (=0.1/0.4)".

On the other hand, in a case in which the image data "I2'" having the test ID "TT2" is input to the encoder of the AE 320B of the module 320B, the output from the DL 300B, a correct label "7" in this example, is input to the decoder of the AE 320B in addition to the output from the encoder of the AE 320B. As a result, decoded data reconstructed in accordance with the correct label "7" is output from the decoder of the AE 320B. As illustrated in FIG. 25, an image obtained by visualizing this decoded data is an image close to "7" in accordance with the correct label, and is similar to the image "7" obtained by visualizing the test data TT2. Due to this, the reconstruction error of the module 320B calculated from an error between the decoded data output from the decoder of the AE 320B and the image data "I2'" having the test ID "TT2" is a value "0.1" that is smaller than that at the time of erroneous recognition. In a case in which the reconstruction error "0.1" of the module 320B calculated from the test data TT2 is input to the calculation unit 340, the adaptability is calculated to be "1.00 (=0.1/0.1)" as illustrated in FIG. 26.

In this way, while the adaptability of the module 320A to the test data TT2 is calculated to be "0.25", the adaptability of the module 320B to the test data TT2 is calculated to be "1.00". As a result of comparison of the adaptability, the output from the DL 300B of the module 320B having a larger adaptability value is selected as the recognition result. Accordingly, the module 320B that can correctly classify the test data TT2 can be selected.

In a case in which the image data "I3'" having the test ID "TT3" is input to the encoder of the AE 320A of the module 320A, the output from the DL 300A, an erroneously recognized label "1" in this example, is input to the decoder of the AE 320A in addition to the output from the encoder of the AE 320A. As a result, decoded data reconstructed in accordance with the erroneously recognized label "1" is output from the decoder of the AE 320A. As illustrated in FIG. 25, an image obtained by visualizing this decoded data is an image close to "1" in accordance with the erroneously recognized label, and is not similar to the image "I" obtained by visualizing the test data TT3. As a result, the reconstruction error of the module 320A calculated from an error between the decoded data output from the decoder of the AE 320A and the image data "I3'" having the test ID "TT3" is a value "0.3" that is larger than that at the time of erroneous recognition. In a case in which the reconstruction error "0.3" of the module 320A calculated from the test data TT3 is input to the calculation unit 340, the adaptability is calculated to be "0.33 (=0.1/0.3)".

On the other hand, in a case in which the image data "I3'" having the test ID "TT3" is input to the encoder of the AE 320B of the module 320B, the output from the DL 300B, a correct label "I" in this example, is input to the decoder of the AE 320B in addition to the output from the encoder of the AE 320B. As a result, decoded data reconstructed in accordance with the correct label "I" is output from the decoder of the AE 320B. As illustrated in FIG. 25, an image obtained by visualizing this decoded data is an image close to "I" in accordance with the correct label, and is similar to the image "I" obtained by visualizing the test data TT3. Due to this, the reconstruction error of the module 320B calculated from an error between the decoded data output from the decoder of the AE 320B and the image data "I3'" having the test ID "TT3" is a value "0.1" that is smaller than that at the time of erroneous recognition. In a case in which the reconstruction error "0.1" of the module 320B calculated from the test data TT3 is input to the calculation unit 340, the adaptability is calculated to be "1.00 (=0.1/0.1)" as illustrated in FIG. 26.

In this way, while the adaptability of the module 320A to the test data TT3 is calculated to be "0.33", the adaptability of the module 320B to the test data TT3 is calculated to be "1.00". As a result of comparison of the adaptability, the output from the DL 300B of the module 320B having a larger adaptability value is selected as the recognition result. Accordingly, the module 320B that can correctly classify the test data TT3 can be selected.

Herein, a difference in adaptability calculated by the calculation unit 340 is compared between the AE 320A in which the output from the DL 300A is input to the decoder and an AE 320A' in which the output from the DL 300A is not input to the decoder, and between the AE 320B in which the output from the DL 300B is input to the decoder and an AE 320B' in which the output from the DL 300B is not input to the decoder.

FIG. 27 is a diagram illustrating an example of output results of the AE. FIG. 27 illustrates a calculation result of the reconstruction error of the AE 320A' and a calculation result of the reconstruction error of the AE 320B' for each of the three pieces of test data TT1 to TT3 illustrated in FIG. 23. FIG. 28 is a diagram illustrating an example of selection results of the module. FIG. 28 illustrates the selection result of the module 320 the adaptability of which is calculated to be the largest among the adaptabilities that are calculated from the reconstruction error of the AE 320A' illustrated in FIG. 27 for each of the three pieces of test data TT1 to TT3 illustrated in FIG. 23.

Comparing FIG. 25 with FIG. 27, in a case in which the test data TT1 and the test data TT3 are input from among three pieces of test data TT1 to TT3, it can be found that there is no difference between the reconstruction error of the AE 320A and the reconstruction error of the AE 320A', and between the reconstruction error of the AE 320B and the reconstruction error of the AE 320B'.

On the other hand, in a case in which the test data TT2 is input, as illustrated in FIG. 27, it can be found that the reconstruction error "0.1" calculated by the AE 320A' is smaller than the reconstruction error "0.2" calculated by the AE 320B'. One reason for that is, as described above with reference to FIG. 15 to FIG. 17, in a case in which the output from the DL 300A is not input to the decoder of the AE 320A' as a trigger for decoding, that there is no penalty for the reconstruction error for reconstructing the data to be closer to the learning data corresponding to the label "1" output from the DL 300A. As a result, the image obtained by visualizing the decoded data output from the decoder of the AE 320A' is, as illustrated in FIG. 27, reconstructed in a state in which the feature of the character "7" included in the original image data "I2'" having the test ID "TT2" is stored, so that the decoded image is similar to the image "7" obtained by visualizing the image data "I2'" having the test ID "TT2". As a result, from an error between the decoded data output from the decoder of the AE 320A' and the image data "I2'" having the test ID "TT2", a value "0.1" that is smaller than the reconstruction error "0.4" of the AE 320A is calculated as the reconstruction error of the AE 320A'. In such a case, while the adaptability of the module 320A is calculated to be "1 (=0.1/0.2)", the adaptability of the module 320B is calculated to be "0.5 (=0.1/0.2)".

As described above, in a case in which the AE 320A' in which the output from the DL 300A is not input to the decoder and the AE 320B' in which the output from the DL 300B is not input to the decoder are used for the module 320A and the module 320B, as illustrated in FIG. 28, it can be found that the module 320A that erroneously classifies the test data TT2 is selected instead of the module 320B that can correctly classify the test data TT2. From this result, paradoxically, technical significance of the configuration of inputting the output from the DL 300 to the decoder of the AE 320 is obviously great in selecting the output from the learning model that can correctly classify the test data.

Processing Procedure

FIG. 29 is a flowchart illustrating a procedure of identification processing according to the third embodiment. By way of example, this processing starts when the test data input unit 310 acquires the test data.

As illustrated in FIG. 29, when the test data is acquired (Step S301), the test data input unit 310 inputs the test data to a plurality of modules 320A to 320C (Step S302). Thereafter, the calculation unit 340 acquires the reconstruction error output from each of the modules 320A to 320C (Step S303).

The calculation unit 340 calculates the adaptability of the output from the DL to the test data for each of the modules 320A to 320C (Step S304). Subsequently, the selection unit 350 selects the output result of the DL of the module 320 from which the largest adaptability is calculated at Step S304 from among the output results of the DL output for each of the modules 320A to 320C (Step S305).

Thereafter, the output unit 360 outputs, to a predetermined output destination, the output result of the DL of the module 320 selected at Step S305 as a recognition result from among the output results of the DL output for each of the modules 320A to 320C (Step S306), and the processing ends.

Aspect of Effect

As described above, the identification device 300 according to the present embodiment selects, from among the output results of a plurality of learning models, the output result of the learning model to be output as a recognition result based on the adaptability calculated for each reconstruction error output from the respective autoencoders that have performed learning with the same learning data as the respective learning models. Thus, the identification device 300 according to the present embodiment prevents the output from a wrong learning model from being selected, so that a possibility of failing in recognition can be reduced. As a result, sequential learning that uses a plurality of learning models generated from pieces of learning data of different data sets can be implemented. Due to this, a larger variety of recognition functions can be provided as compared with a case of individually using each learning model.

In the third embodiment described above, the output from the module 320 from which the largest adaptability is calculated is selected without condition, but it is allowed that any output from the module 320 is not selected. For example, the selection unit 350 determines whether the largest adaptability is equal to or larger than a predetermined threshold. The selection unit 350 can select the output from the module 320 from which the largest adaptability is calculated only in a case in which the largest adaptability is equal to or larger than the threshold. This configuration can prevent the recognition result of the test data not adapted to any module 320 from being output. Although an example of prohibiting the module 320 from being selected is described herein, the output from the DL of the module 320 may be prohibited from being output as the recognition result.

Although the output from the module 320 from which the largest adaptability is calculated is selected in the third embodiment described above, only the module 320 from which the largest adaptability is calculated is not always selected. For example, the selection unit 350 can select, from among the outputs from the DL of the module 320, the output from the DL of the module 320 having adaptability equal to or larger than the threshold, or outputs from the DL of a predetermined number of modules 320 in a descending order of adaptability. In this way, in a case in which outputs from the DL of a plurality of modules 320 are selected, the output unit 360 can output an aggregated value obtained by aggregating the outputs from the DL of the modules 320. For example, in a case in which the aggregated value is a discrete label such as classification, the largest number of labels may be determined based on majority rule among the modules 320, and the determined label may be output. In a case in which the aggregated value is a successive label such as regression, a statistic such as an average value, a median, and a mode can be output.

Adaptability of a learning model with respect to input data can be calculated.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An adaptability calculation method executed by a computer, the adaptability calculation method comprising:
    inputting input data to a machine learning model, trained to perform classification, and to an encoder of an autoencoder, the machine learning model and the autoencoder trained by identical learning data;
    inputting an output from the machine learning model and an output from the encoder of the autoencoder to a decoder of the autoencoder; and
    calculating, based on an output from the decoder and the input data, adaptability that a category to which the input data belongs is adapted to a category of a label given to the learning data used for training the machine learning model.

2. The adaptability calculation method according to claim 1, the adaptability calculation method further comprising: training the autoencoder by inputting a label of correctness given to the learning data to the decoder, and decoding encoded data outputted from the encoder to which the learning data is inputted based on the label of correctness.

3. The adaptability calculation method according to claim 1, the adaptability calculation method further comprising training the autoencoder by inputting, to the decoder, a label or a certainty factor for the label outputted from the machine learning model to which the learning data is inputted, and decoding encoded data outputted from the encoder to which the learning data is inputted based on the label or the certainty factor.

4. The identification method adaptability calculation method according to claim 1, wherein
    the computer includes a plurality of learning modules that have performed learning with different pieces of learning data; and wherein
    the plurality of learning modules executes the inputting the input data, the inputting the output, and the calculating.

5. The identification method according to claim 4, the identification method further comprising:
    outputting, by the plurality of learning modules, the adaptability and the output from the machine learning model; and
    selecting an output result of a learning module, included in the plurality of learning modules, outputting the largest adaptability among a plurality of adaptabilities.

6. The identification method according to claim 4, the identification method further comprising: when the largest adaptability among the adaptabilities is smaller than a predetermined threshold, prohibiting the output result of the learning module from being selected, or prohibiting the selected output result of the learning module from being output.

7. The identification method according to claim 4, the identification method further comprising: outputting an aggregated value obtained by aggregating output results of the plurality of learning modules having adaptability equal to or larger than a predetermined threshold among the adaptabilities.

8. A non-transitory computer-readable recording medium having stored therein a program that causes a computer to execute a process comprising:
    inputting input data to a machine learning model, trained to perform classification, and to an encoder of an autoencoder, the machine learning model and the autoencoder trained by identical learning data;
    inputting an output from the machine learning model and an output from the encoder of the autoencoder to a decoder of the autoencoder; and
    calculating based on an output from the decoder and the input data, adaptability that a category to which the input data belongs is adapted to a category of a label given to the learning data used for training the machine learning model.

9. The computer-readable recording medium according to claim 8, the process further comprising training the autoencoder by inputting a label of correctness given to the learning data to the decoder, and decoding encoded data outputted from the encoder to which the learning data is inputted based on the label of correctness.

10. The computer-readable recording medium according to claim 8, the process further comprising training the autoencoder by inputting, to the decoder, a label or a certainty factor for the label outputted from the machine learning model to which the learning data is inputted, and decoding encoded data outputted from the encoder to which the learning data is inputted based on the label or the certainty factor.

11. The computer-readable recording medium according to claim 8,
    wherein the process includes a plurality of learning modules that have performed learning with different pieces of learning data; and
    wherein the plurality of learning modules executes the inputting the input data, the inputting the output, and the calculating.

12. The computer-readable recording medium according to claim 11, the process further comprising:
    outputting, by the plurality of learning modules, the adaptability and the output from the machine learning model; and
    selecting an output result of a learning module, included in the plurality of learning modules, outputting the largest adaptability among the adaptabilities.

13. The computer-readable recording medium according to claim 11, the process further comprising: when the largest adaptability among the adaptabilities is smaller than a predetermined threshold, prohibiting the output result of the learning module from being selected, or prohibiting the selected output result of the learning module from being output.

14. The computer-readable recording medium according to claim 11, the process further comprising: outputting an aggregated value obtained by aggregating output results of the plurality of learning modules having adaptability equal to or larger than a predetermined threshold among the adaptabilities.

15. An adaptability calculation device, the adaptability calculation device comprising:
   a memory and a processor coupled to the memory and configured to:
     input data to a machine learning model, trained to perform classification, and to an encoder of an autoencoder, the machine learning model and the autoencoder trained by identical learning data;
     input an output from the machine learning model and an output from the encoder of the autoencoder to a decoder of the autoencoder; and
     calculate, based on an output from the decoder and the input data, adaptability that a category to which the input data belongs is adapted to a category of a label given to the learning data used for training the machine learning model.

\* \* \* \* \*